United States Patent
Yao

(10) Patent No.: US 11,609,670 B2
(45) Date of Patent: Mar. 21, 2023

(54) TOUCH DISPLAY PANEL AND MANUFACTURING METHOD THEREOF, AND DISPLAY DEVICE

(71) Applicant: Xiamen Tianma Micro-Electronics Co., Ltd., Xiamen (CN)

(72) Inventor: Qijun Yao, Shanghai (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 17/350,634

(22) Filed: Jun. 17, 2021

(65) Prior Publication Data
US 2022/0276742 A1    Sep. 1, 2022

(30) Foreign Application Priority Data
Feb. 26, 2021    (CN) .......................... 202110220788.7

(51) Int. Cl.
*G06F 3/044*    (2006.01)
*G06F 3/041*    (2006.01)

(52) U.S. Cl.
CPC .......... *G06F 3/0446* (2019.05); *G06F 3/0412* (2013.01); *G06F 2203/04103* (2013.01)

(58) Field of Classification Search
CPC ................. G06F 3/0446; G06F 3/0412; G06F 2203/04103
See application file for complete search history.

(56) References Cited

U.S. PATENT DOCUMENTS

| 2018/0335919 A1* | 11/2018 | Xu ........................ G06F 3/0443 |
| 2019/0004638 A1* | 1/2019 | Lee ....................... G06F 3/0443 |

FOREIGN PATENT DOCUMENTS

CN    105630226 A    6/2016

\* cited by examiner

*Primary Examiner* — Peter D McLoone
(74) *Attorney, Agent, or Firm* — Anova Law Group PLLC

(57) ABSTRACT

A touch display panel, a manufacturing method of a touch display panel, and a display device are provided. The touch display panel includes a substrate and a touch electrode on the substrate. The touch electrode includes a first electrode line extending in a first direction and a second electrode line extending in a second direction. The second direction is different from the first direction. The touch electrode also includes an intersection area. In the intersection area, the first electrode line intersects with the second electrode line. At least one of the first electrode line and the second electrode line includes one or more concave structures in the intersection area.

20 Claims, 17 Drawing Sheets

TOUCH DISPLAY PANEL AND MANUFACTURING METHOD THEREOF, AND DISPLAY DEVICE

CROSS-REFERENCE TO RELATED APPLICATION

This application claims priority of Chinese Patent Application No. 202110220788.7, filed on Feb. 26, 2021, the entire content of which is hereby incorporated by reference.

FIELD OF THE DISCLOSURE

The present disclosure generally relates to the field of display technology and, more particularly, relates to a touch display panel and a manufacturing method thereof, and a display device.

BACKGROUND

A touch display device may detect a coordinate position of a finger in a plane of a display screen of the touch display device through a touch electrode, and perform corresponding display according to the coordinate position.

In an existing touch display device, to reduce parasitic capacitance and improve touch performance, a metal grid is often used as a touch electrode. However, when a metal grid is used as a touch electrode, the touch display device may exhibit a Moiré-like uneven display phenomenon.

SUMMARY

One aspect of the present disclosure includes a touch display panel. The touch display panel includes a substrate and a touch electrode on the substrate. The touch electrode includes a first electrode line extending in a first direction and a second electrode line extending in a second direction. The second direction is different from the first direction. The touch electrode also includes an intersection area. In the intersection area, the first electrode line intersects with the second electrode line. At least one of the first electrode line and the second electrode line includes one or more concave structures in the intersection area.

Another aspect of the present disclosure includes a manufacturing method of a touch display panel. The manufacturing method includes forming a substrate, and forming a touch electrode through a photomask. The touch electrode includes a first electrode line extending in a first direction and a second electrode line extending in a second direction. The second direction is different from the first direction. The touch electrode also includes an intersection area. In the intersection area, the first electrode line intersects with the second electrode line. At least one of the first electrode line and the second electrode line includes one or more concave structures in the intersection area.

Another aspect of the present disclosure includes a display device. The display device includes a touch display panel. The touch display panel includes a substrate and a touch electrode on the substrate. The touch electrode includes a first electrode line extending in a first direction and a second electrode line extending in a second direction. The second direction is different from the first direction. The touch electrode also includes an intersection area. In the intersection area, the first electrode line intersects with the second electrode line. At least one of the first electrode line and the second electrode line includes one or more concave structures in the intersection area.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

To make the objectives, technical solutions and advantages of the present disclosure clearer and more explicit, the present disclosure is described in further detail with accompanying drawings and embodiments. It should be understood that the specific exemplary embodiments described herein are only for explaining the present disclosure and are not intended to limit the present disclosure.

Reference will now be made in detail to exemplary embodiments of the present disclosure, which are illustrated in the accompanying drawings. Wherever possible, the same reference numbers will be used throughout the drawings to refer to the same or like parts.

It should be noted that relative arrangements of components and steps, numerical expressions and numerical values set forth in exemplary embodiments are for illustration purpose only and are not intended to limit the present disclosure unless otherwise specified. Techniques, methods and apparatus known to the skilled in the relevant art may not be discussed in detail, but these techniques, methods and apparatus should be considered as a part of the specification, where appropriate.

It should be noted that in the present disclosure, relational terms such as "first" and "second" are used only to distinguish one entity or operation from another entity or operation, and do not necessarily require or imply any such actual relationship or order between these entities or operations. Moreover, terms "include", "comprise" or any other variations thereof are intended to cover non-exclusive inclusion. A process, a method, an article, or an equipment including a series of elements may not only include those elements, but also include other elements that are not explicitly listed, or elements inherent to the process, the method, the article, or the equipment. Without additional restrictions, when a phrase "including . . . " is used to identify an element, other identical elements may exist in a process, a method, an article, or an equipment including the element.

Figure 1:
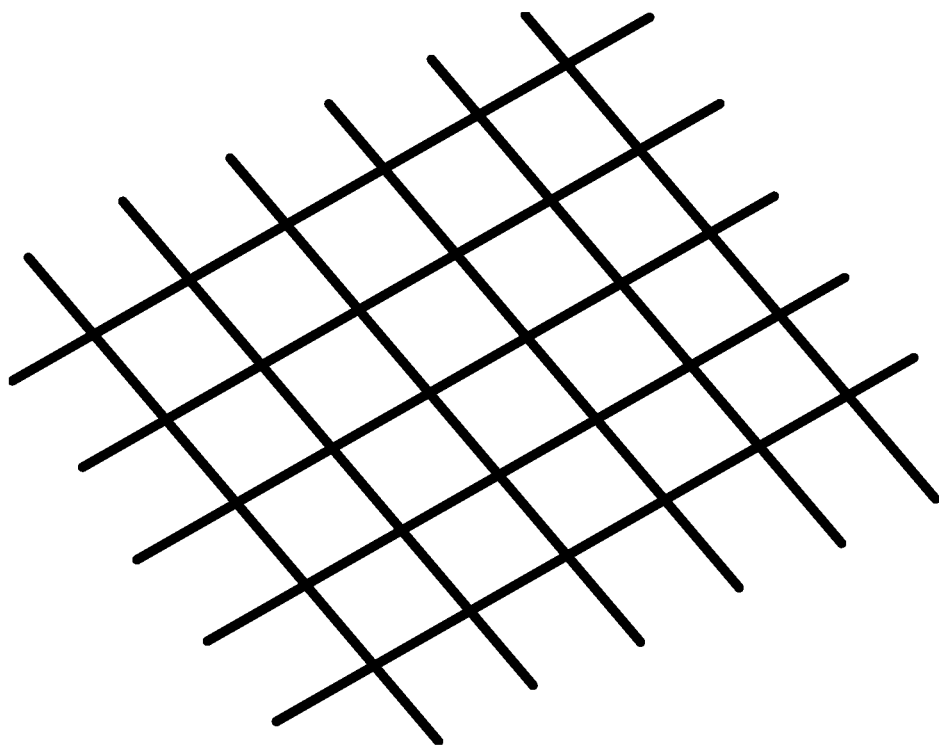
FIG. 1 illustrates a schematic plan view of a photomask.

In existing technology, when forming a touch electrode with a grid structure on a substrate, first, a metal layer is formed on one side of the substrate, a layer of photoresist is uniformly coated on the metal layer, and ultraviolet light irradiates the photoresist on the substrate through a photomask for exposure. Next, an exposed portion of the photoresist is dissolved by a developer, resulting in a part of the photoresistor with a pattern in a desired shape. FIG. 1 illustrates a schematic plan view of a photomask. As shown in FIG. 1, the photomask includes a grid structure connected to each other. In an actual production process, a developer may not etch a portion of the photoresist corresponding to an intersection angle of the photomask into a complete intersection angle. Accordingly, an intersection angle of the photoresist after etching may be widened.

Figure 2:
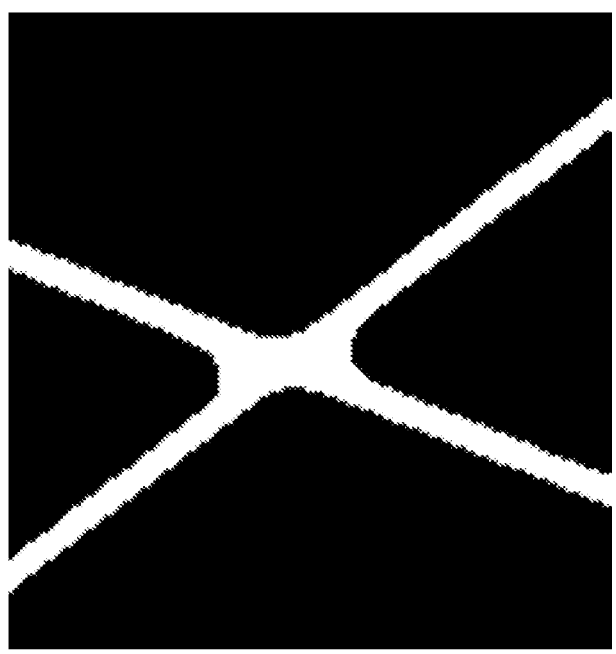
FIG. 2 illustrates a picture of a portion of a touch electrode.

Then, a portion of the metal layer that is not covered by the photoresist is etched. Since the intersection angle of the photoresist may be widened, an intersection angle of the metal layer that is covered by the photoresist and thus not etched may also be widened. After the photoresist is removed, a touch electrode with a grid shape may be formed on one side of the substrate. Correspondingly, an intersection area of the touch electrode may be widened. FIG. 2 illustrates a picture of a portion of a touch electrode. With reference to FIG. 2, an intersection area of a touch electrode, manufactured with a photomask, may be widened. Accordingly, covering of pixels in a touch display panel by the intersection area may be increased, thus affecting display effect of the touch display panel.

To address the problems of display unevenness in existing technology, the present disclosure provides a touch display panel, a manufacturing method thereof, and a display device.

Figure 3:
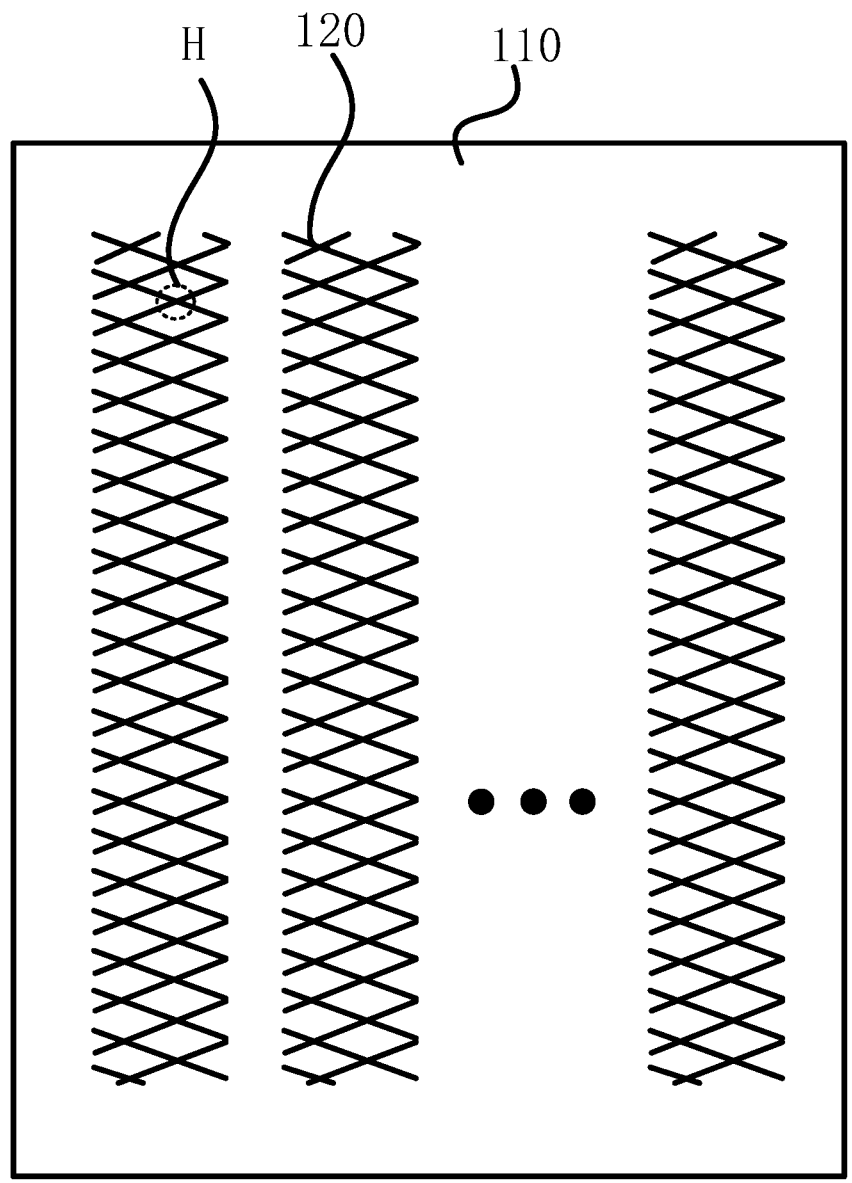
FIG. 3 illustrates a schematic plan view of a touch display panel consistent with the disclosed embodiments of the present disclosure.

FIG. 3 illustrates a schematic plan view of a touch display panel consistent with the disclosed embodiments of the present disclosure. With reference to FIG. 3, the present disclosure provides a touch display panel including a substrate 110 and a touch electrode 120. The touch electrode 120 is disposed on the substrate 110. The substrate 110 may be a rigid substrate or a flexible substrate. When the substrate 110 is a rigid substrate, the substrate 110 may be a glass substrate. When the substrate 110 is a flexible substrate, the substrate 110 may be a polyimide (PI) substrate. The touch electrode 120 is formed on the substrate 110.

In some embodiments, the touch electrode 120 may include a metal grid structure. Since the touch electrode 120 is made of metal, touch performance and bending performance of the touch electrode 120 may be improved. In one embodiment, the touch electrode 120 may be made of one or more of materials including Cr, Ni, Cu, Al, Ag, Mo, Au, and Ti. The touch electrode 120 includes a grid structure formed by a plurality of touch lines. Thus, an area of the touch electrode 120 may be decreased, resistance of the touch electrode 120 may be reduced, and touch sensitivity may be improved. Impact of the touch electrode 120 on display effect of the touch display panel may be reduced. When, in a direction perpendicular to the substrate 110, the touch electrode 120 includes a touch sensing electrode and a touch driving electrode that partially overlap, an overlapping area between the touch sensing electrode and the touch driving electrode may be reduced, and thus a plate capacitance value may be reduced. Accordingly, parasitic capacitance may be reduced, and touch sensitivity may be improved.

When the touch electrode is a mutual-capacitance touch electrode, the touch electrode may include a touch driving electrode and a touch sensing electrode. A capacitance may be formed between the touch driving electrode and the touch sensing electrode. When a finger touches the touch electrode, by detecting a position of capacitance change, a touch position may be confirmed accordingly. The touch driving electrode and the touch sensing electrode are insulated from each other. The touch driving electrode and the touch sensing electrode may be arranged on different film layers, or may be arranged on a same film layer. In one embodiment, one of the touch driving electrode and the touch sensing electrode may have a metal grid structure, and another one of the touch driving electrode and the touch sensing electrode may have a strip or block structure. In some other embodiments, each of the touch driving electrode and the touch sensing electrode may have a metal grid structure.

When the touch electrode is a self-capacitance touch electrode, the touch electrode may include a metal grid structure.

Figure 4:
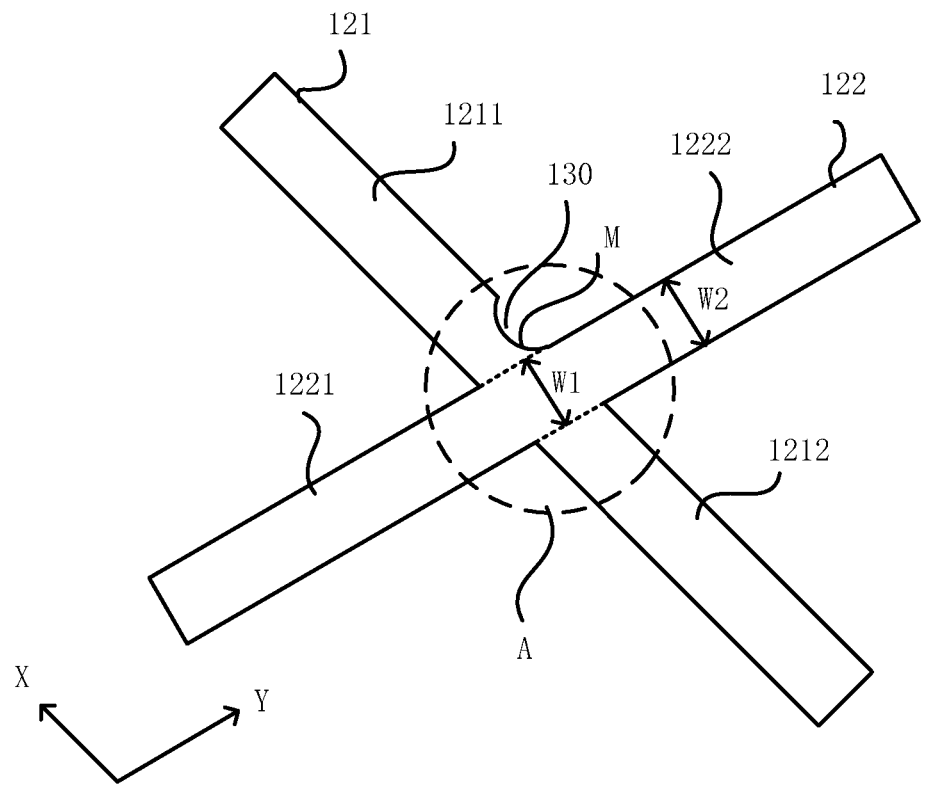
FIG. 4 illustrates an enlarged schematic diagram of part H of a touch display panel shown in FIG. 3, consistent with the disclosed embodiments of the present disclosure.

FIG. 4 illustrates an enlarged schematic diagram of part H of a touch display panel shown in FIG. 3. With reference to FIG. 3 and FIG. 4, the touch electrode 120 may include a grid structure composed of a plurality of electrode lines. Specifically, the touch electrode 120 may include a plurality of first electrode line 121 and a plurality of second electrode line 122. A first electrode line 121 of the plurality of first electrode line 121 extends along a first direction X, and a second electrode line 122 of the plurality of second electrode line 122 extends along a second direction Y. The second direction Y and the first direction X are different directions, that is, the first electrode line 121 and the second electrode line 122 intersect each other. The plurality of first electrode lines 121 and the plurality of second electrode lines 122 intersect each other, such that the touch electrode 120 may have a grid structure.

An intersection of the first electrode line 121 and the second electrode line 122 is located in an intersection area A. At least one of the first electrode line 121 and the second electrode line 122 includes a concave structure 130 in the intersection area A. The concave structure 130 is a notch formed by concaving a side M of the electrode wire toward inside of the electrode line. In one embodiment, the first electrode line 121 includes a concave structure 130, that is, the side M of the first electrode line 121 is recessed toward inside of the first electrode line 121 in the intersection area A to form the concave structure 130. In one embodiment, a line of the concave structure 130 has an arc shape.

A line width of a portion of the electrode line (the first electrode line and/or the second electrode line) with the concave structure 130 is smaller than a line width of a normal portion (a portion does not include the concave structure). The line width of an electrode line refers to a distance between two sides of the electrode line in a direction perpendicular to an extending direction of the electrode line. In one embodiment, in the direction perpendicular to the extending direction of the electrode line, a depth of the concave structure 130 is less than approximately 50% of the line width of the normal portion of the electrode line. In one embodiment, with reference to FIG. 4, the line width of the normal portion of the first electrode line 121 is approximately 2 μm, and the line width of the portion including the concave structure 130 is greater than or equal to approximately 1 μm and less than or equal to approximately 2 μm.

The line width of the electrode line in the intersection area refers to a distance between extending lines of the two sides of the electrode line in the intersection area in a direction perpendicular to the extending direction of the electrode line.

In the present disclosure, at least one of the first electrode line 121 and the second electrode line 122 in the touch electrode 120 includes the concave structure 130 in the intersection area A. Accordingly, a vertical projection area of the intersection area A of the first electrode line 121 and the second electrode line 122 on the substrate 110 may be reduced. As a result, covering of pixels by the intersection area A may be reduced, and display effect of the display panel may thus be improved.

It should be noted that the present disclosure does not limit the electrode lines in the touch electrode to only the first electrode line or the second electrode line. Naming of the first electrode line and the second electrode line is only for convenience of describing a location of the concave structure.

With continuous reference to FIG. 3 and FIG. 4, in some embodiments, in the intersection area A, the first electrode line 121 includes the concave structure 130, and the second electrode line 122 does not include the concave structure 130.

In addition, when each of four intersection angles of the first electrode line and the second electrode line in the intersection area includes the concave structure 130, a width of the intersection of the touch electrode may be small. Accordingly, risk of line breakage may be high in the intersection area, and a fabrication process may be difficult. In one embodiment, in the intersection area A, only the first electrode line 121 includes the concave structure 130, and the second electrode line 122 does not include the concave structure 130. With such a configuration, a problem of a large width of the intersection area may be solved, probability of line breakage in the intersection area A may be reduced, and further, difficulty in a fabrication process of the touch electrode may be reduced.

In one embodiment, in the touch electrode 120, in the intersection area A, only the first electrode line 121 includes the concave structure 130. While the covering of pixels by the intersection area A of the first electrode line 121 and the second electrode line 122 may be reduced, a problem that the area of the intersection A of the first electrode line 121 and the second electrode line 122 is too small and thus the resistance of the intersection A is too large may be avoided.

With continuous reference to FIG. 4, in some embodiments, in the intersection area A, in a direction perpendicular to the second direction Y, a minimum distance between the extending lines of the two side edges of the second electrode line 122 is W1. That is, the minimum width of the second electrode line 122 in the direction perpendicular to the second direction Y is W1.

In an area other than the intersection area A, in the direction perpendicular to the second direction Y, the distance between the two sides of the second electrode line 122 is W2. That is, the width of the second electrode line 122 in the direction perpendicular to the second direction Y is W2.

In some embodiments, W1≥0.9×W2. In one embodiment, W1≥W2. That is, the line width of a portion of the second electrode line 122 in the intersection area A and the line width of a portion of the second electrode line 122 other than the intersection area A tend to be equal. The concave structure 130 on the first electrode line 121 does not affect the line width of the portion of the second electrode line 122 located in the intersection area A. Accordingly, the concave structure 130 on the first electrode line 121 may be avoided from making the area of the intersection A of the first electrode line 121 and the second electrode line 122 to be too small.

With continuous reference to FIG. 4, in some embodiments, the intersection area A includes only one concave structure 130. Specifically, in the intersection area A, only the first electrode line 121 includes the concave structure 130. In the first direction X, the concave structure 130 is located on one side of the second electrode line 122.

Figure 5:
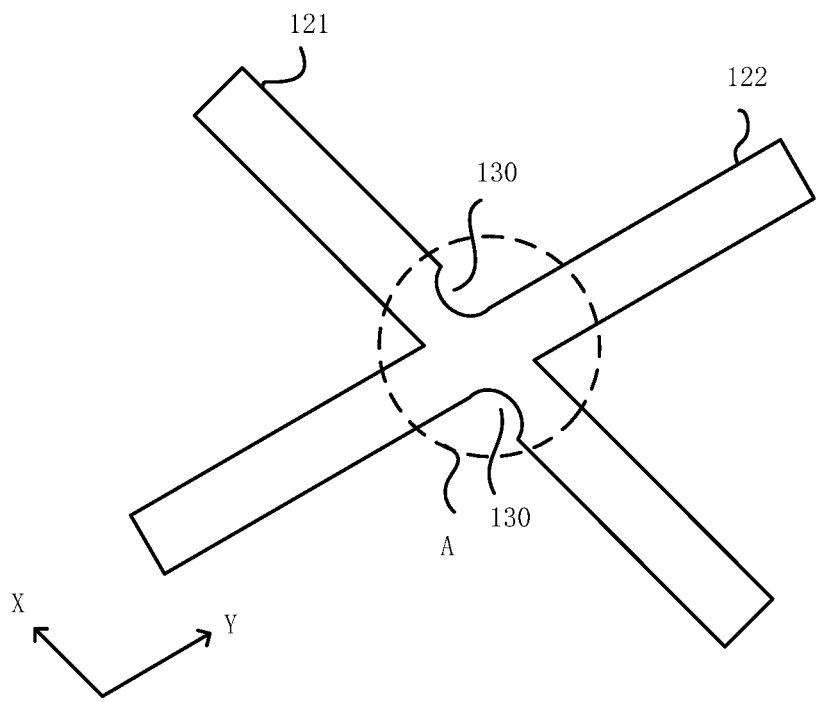
FIG. 5 illustrates another enlarged schematic diagram of part H of a touch display panel shown in FIG. 3, consistent with the disclosed embodiments of the present disclosure.

FIG. 5 illustrates another enlarged schematic diagram of part H of a touch display panel shown in FIG. 3. Referring to FIG. 5, in some embodiments, the intersection area A includes two concave structures 130. Specifically, in the intersection area A, the first electrode line 121 includes two concave structures 130. In the first direction X, the two concave structures 130 are respectively located on two sides of the second electrode line 122.

With continuous reference to FIG. 5, in some embodiments, in the intersection area A, the first electrode line 121 includes two concave structures 130. In the first direction X, the two concave structures 130 are respectively located on two sides of the second electrode line 122, and the two concave structures 130 are respectively located on two opposite sides of the first electrode line 121.

Figure 6:
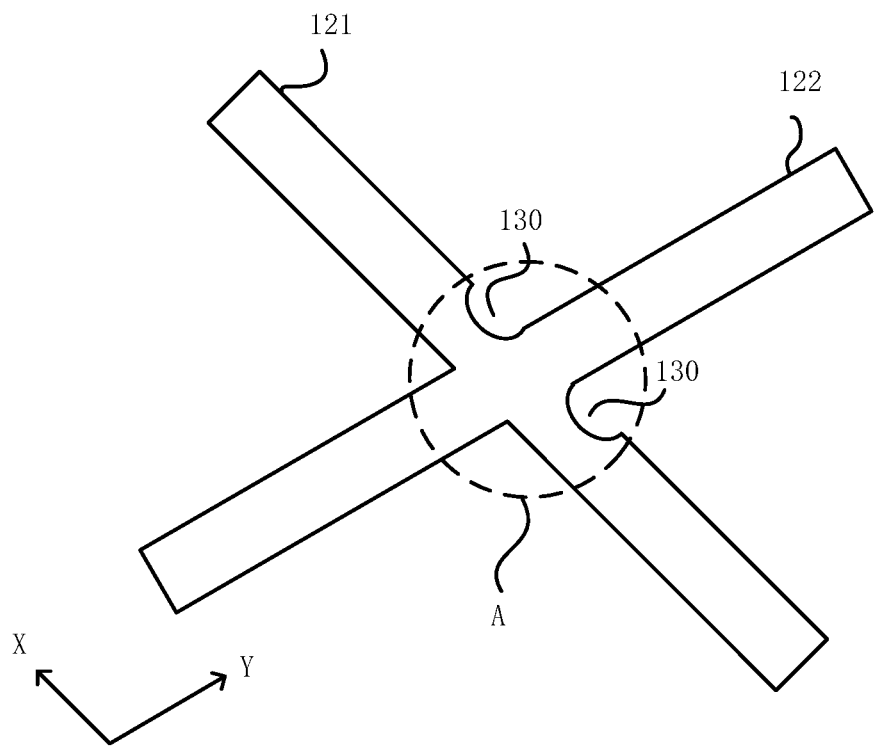
FIG. 6 illustrates another enlarged schematic diagram of part H of a touch display panel shown in FIG. 3, consistent with the disclosed embodiments of the present disclosure.

FIG. 6 illustrates another enlarged schematic diagram of part H of a touch display panel shown in FIG. 3. With reference to FIG. 6, in some embodiments, in the intersection area A, the first electrode line 121 includes two concave structures 130. In the first direction X, the two concave structures 130 are respectively located on two sides of the second electrode line 122, and the two concave structures 130 are located on a same side of the first electrode line 121.

Figure 7:
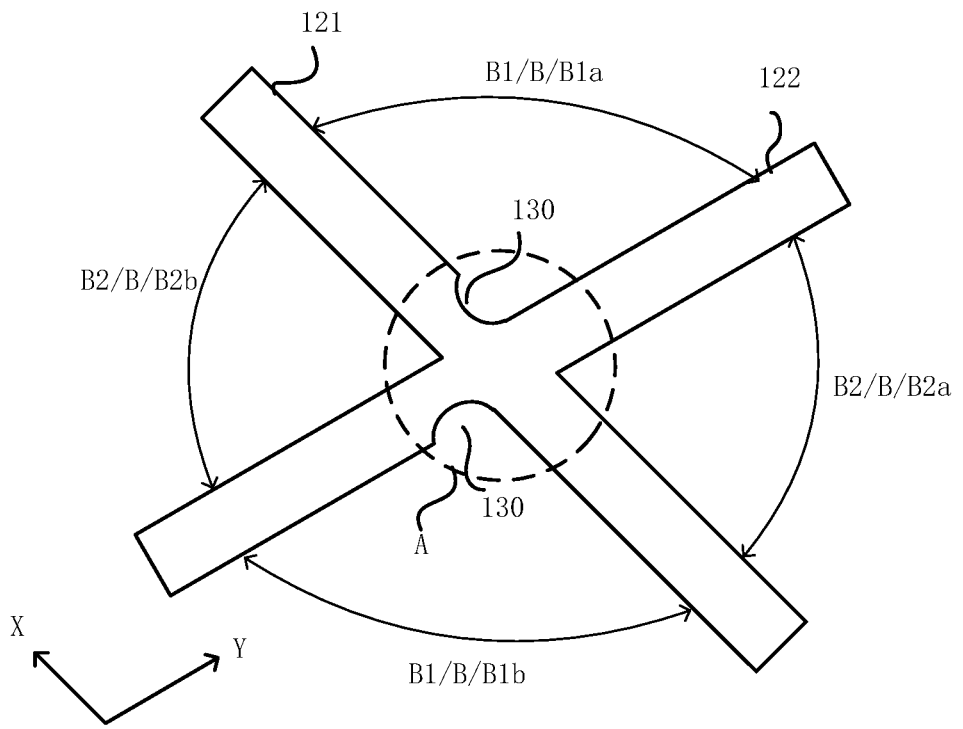
FIG. 7 illustrates another enlarged schematic diagram of part H of a touch display panel shown in FIG. 3, consistent with the disclosed embodiments of the present disclosure.

FIG. 7 illustrates another enlarged schematic diagram of part H of a touch display panel shown in FIG. 3. With reference to FIG. 3 and FIG. 7, in some embodiments, in the intersection area A of the touch electrode 120, each of the first electrode line 121 and the second electrode line 122 includes the concave structure 130. Accordingly, a vertical projection area of the intersection area A of the first electrode line 121 and the second electrode line 122 on the substrate 110 may be reduced, and the covering of pixels by the intersection area A of the first electrode line 121 and the second electrode line 122 may be reduced. As such, display effect of the display panel may be improved.

With continuous reference to FIG. 7, in some embodiments, the intersection area A includes two concave structures 130. Accordingly, fracture probability in the intersection area A may be reduced and process difficulty may be reduced. The covering of pixels by the intersection area A of the first electrode line 121 and the second electrode line 122 may be reduced. In addition, a problem that the area of the intersection A of the first electrode line 121 and the second electrode line 122 is too small and thus resistance of the intersection A is too large may be avoided.

Specifically, the first electrode line 121 includes one concave structure 130. In the first direction X, the concave structure 130 of the first electrode line 121 is located on one side of the second electrode line 122. The second electrode line 122 includes one concave structure 130. In the second direction Y, the concave structure 130 of the second electrode line 122 is located on one side of the first electrode line 121.

In some embodiments, in one crossing area A, one first electrode line 121 and one second electrode line 122 intersect, resulting in four intersection angles B.

Figure 8:
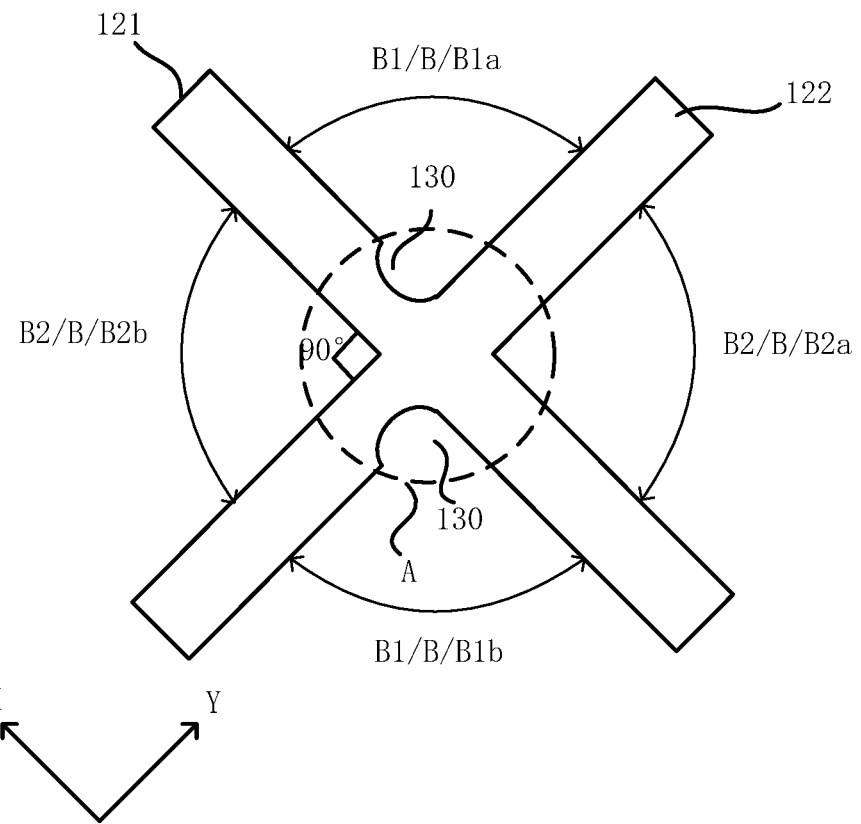
FIG. 8 illustrates another enlarged schematic diagram of part H of a touch display panel shown in FIG. 3, consistent with the disclosed embodiments of the present disclosure.

FIG. 8 illustrates another enlarged schematic diagram of part H of a touch display panel shown in FIG. 3. Specifically, with reference to FIG. 8, in some embodiments, the four intersection angles B (including two intersection angles B1 and two intersection angles B2) defined by the intersection of the first electrode line 121 and the second electrode line 122 are equal. That is, the extending direction of the first electrode line 121 is perpendicular to the extending direction of the second electrode line 122, and each of the four intersection angles B between the first electrode line 121 and the second electrode line 122 is 90°.

With continuous reference to FIG. 7, in some embodiments, the first electrode line 121 and the second electrode line 122 intersect, defining four intersection angles B. The four intersection angles B include two acute angles and two obtuse angles. The first electrode line 121 and the second electrode wire 122 intersect, forming two opposite first intersection angles B1 and two opposite second intersection angles B2. The two first intersection angles B1 are obtuse angles, that is, each of the two first intersection angles B1 is within a range of 90°-180°. The two second intersection angles B2 are acute angles, that is, each of the second intersection angles B2 is within a range of 0°-90°.

Figure 9:
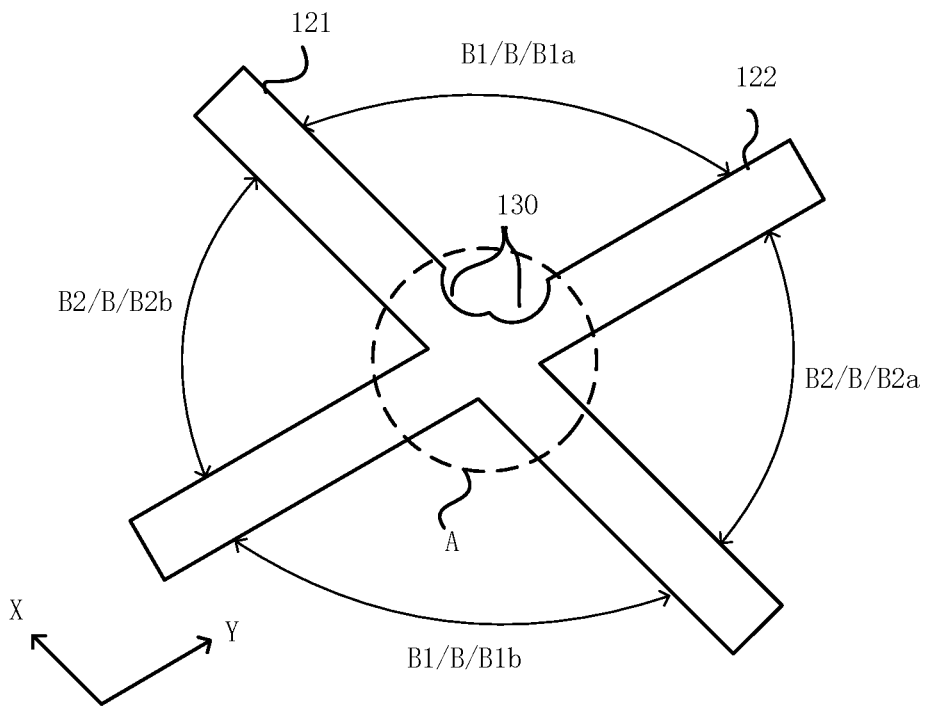
FIG. 9 illustrates another enlarged schematic diagram of part H of a touch display panel shown in FIG. 3, consistent with the disclosed embodiments of the present disclosure.

FIG. 9 illustrates another enlarged schematic diagram of part H of a touch display panel shown in FIG. 3. With reference to FIG. 9, the first electrode wire 121 and the second electrode wire 122 intersect, forming two opposite first intersection angles B1 and two opposite second intersection angles B2. For one of the intersection angles B, the concave structure 130 of the first electrode line 121 and the concave structure 130 of the second electrode line 122 are each located within the intersection angle B. In one embodiment, for one of the intersection angles B1a, the concave structure 130 of the first electrode line 121 and the concave structure 130 of the second electrode line 122 are each located in a region corresponding to the intersection angle B1a.

It should be noted that FIG. 9 exemplarily shows that the two first intersection angles B1 are obtuse angles, and the two second intersection angles B2 are acute angles. The concave structures 130 of the first electrode line 121 and the concave structures 130 of the second electrode line 122 are located within a same first intersection angle B1.

Figure 10:
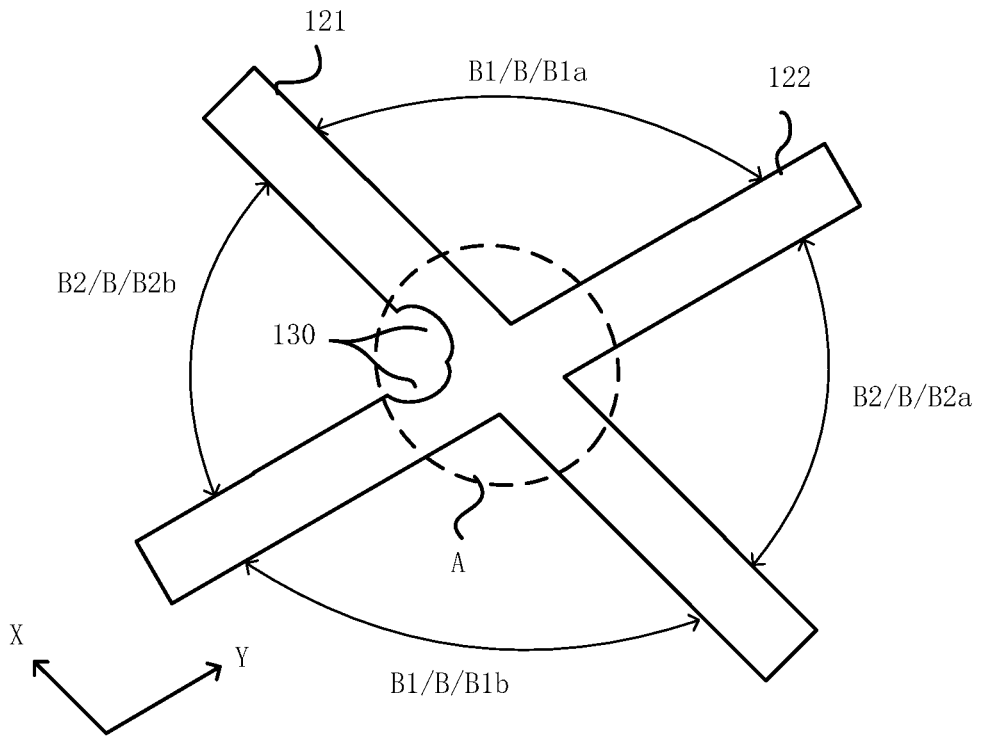
FIG. 10 illustrates another enlarged schematic diagram of part H of a touch display panel shown in FIG. 3, consistent with the disclosed embodiments of the present disclosure.

FIG. 10 illustrates another enlarged schematic diagram of part H of a touch display panel shown in FIG. 3. With reference to FIG. 10, in some embodiments, the two first intersection angles B1 are obtuse angles, and the two second intersection angles B2 are acute angles. The concave structure 130 of the first electrode line 121 and the concave structure 130 of the second electrode line 122 are located within a same second intersection angle B2.

With continuous reference to FIG. 9, in some embodiments, the first electrode line 121 and the second electrode line 122 intersect, defining four intersection angles B. For one of the intersection angles B, the concave structure 130 of the first electrode line 121 and the concave structure 130 of the second electrode line 122 are each located outside the intersection angle B. In one embodiment, for an intersection angle B1b, an intersection angle B2a, and an intersection angle B2b, the concave structure 130 of the first electrode line 121 and the concave structure 130 of the second electrode line 122 are each located within an intersection angle B1a. That is, the concave structure 130 of the first electrode line 121 and the concave structure 130 of the second electrode line 122 are located outside a region corresponding to the intersection angle B (the intersection angle B1b, the intersection angle B2a, and the intersection angle B2b).

With continuous reference to FIG. 7, in some embodiments, for one of the intersection angles B, one of the concave structure 130 of the first electrode line 121 and the concave structure 130 of the second electrode line 122 is located within the intersection angle B, and another of the concave structure 130 of the first electrode line 121 and the concave structure 130 of the second electrode line 122 is located outside the intersection angle B. In one embodiment, for the intersection angle B1a, the concave structure 130 of the first electrode line 121 is located in the intersection angle B1a, and the concave structure 130 of the second electrode line 122 is located in the intersection angle B1b. That is, the concave structure 130 of the second electrode line 122 is located outside the intersection angle B1a.

Figure 11:
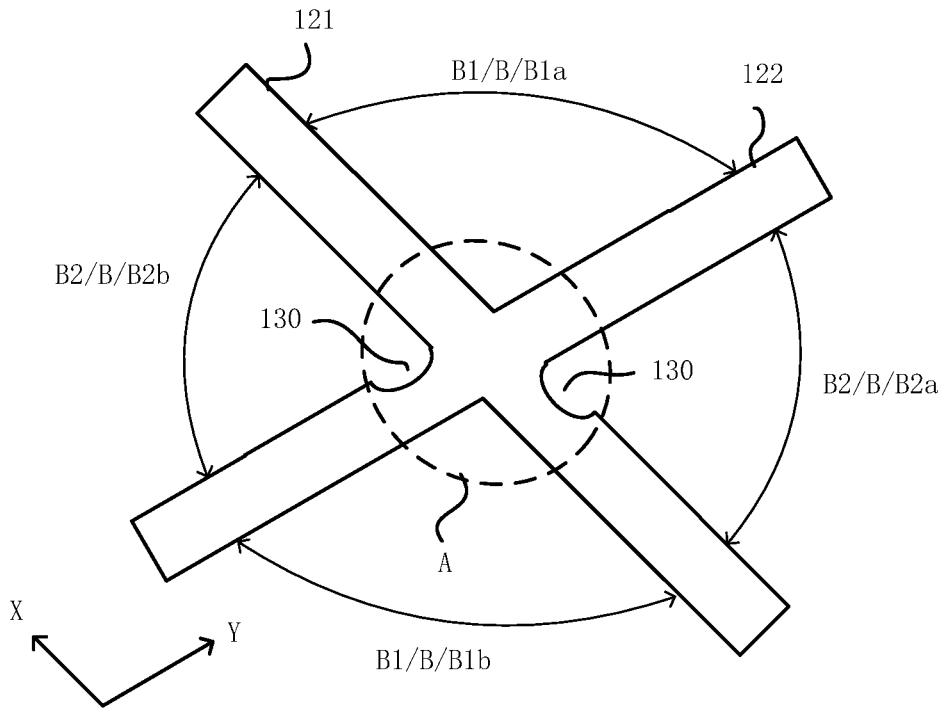
FIG. 11 illustrates another enlarged schematic diagram of part H of a touch display panel shown in FIG. 3, consistent with the disclosed embodiments of the present disclosure.

FIG. 11 illustrates another enlarged schematic diagram of part H of a touch display panel shown in FIG. 3. With reference to FIG. 11, in some embodiments, in the intersection area A, the first electrode line 121 and the second electrode trace 122 intersect, forming two opposite first intersection angles B1 and two opposite second intersection angles B2. The two first angles B1 are obtuse angles, and the two second angles B2 are acute angles. The concave structure 130 of the first electrode line 121 is located in the intersection angle B2a, and the concave structure 130 of the second electrode line 122 is located in the intersection angle B2b. That is, each of the concave structures 130 is located within the angle B that is an acute angle.

With reference to FIG. 7, in some embodiments, in the intersection area A, the first electrode line 121 and the second electrode trace 122 intersect, forming two opposite first intersection angles B1 and two opposite second intersection angles B2. The two first angles B1 are obtuse angles, and the two second angles B2 are acute angles. The concave structure 130 of the first electrode line 121 is located in the intersection angle B1a, and the concave structure 130 of the second electrode line 122 is located in the intersection angle B1b. That is, each of the concave structures 130 is located within the angle B that is an obtuse angle.

Figure 12:
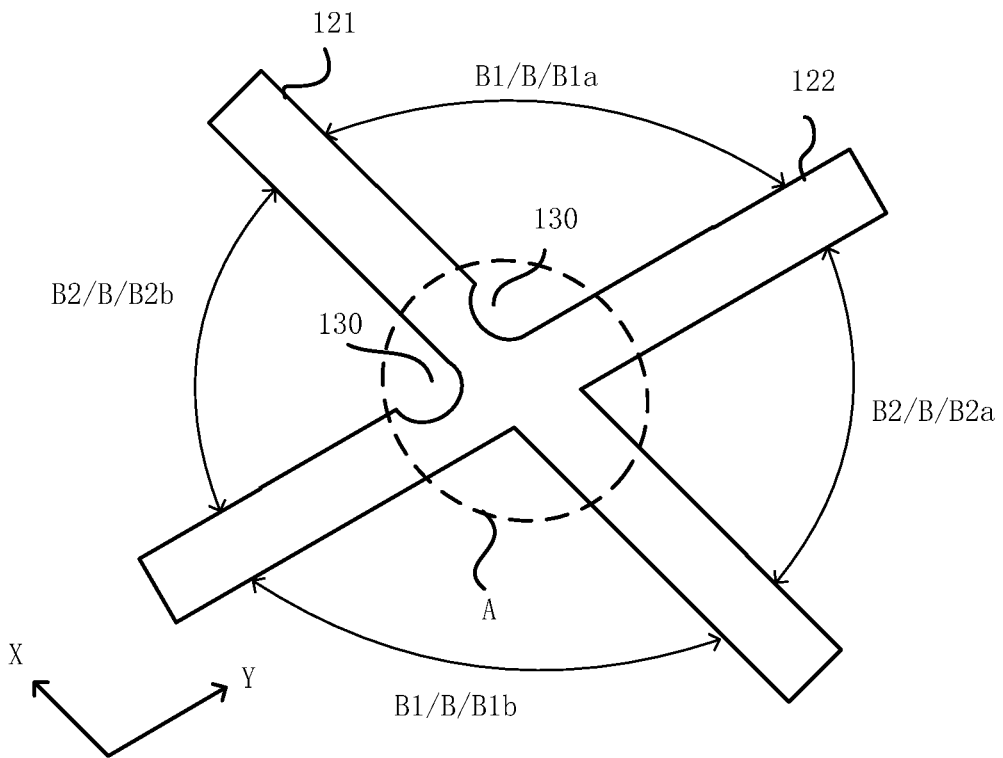
FIG. 12 illustrates another enlarged schematic diagram of part H of a touch display panel shown in FIG. 3, consistent with the disclosed embodiments of the present disclosure.

FIG. 12 illustrates another enlarged schematic diagram of part H of a touch display panel shown in FIG. 3. With reference to FIG. 12, in some embodiments, in the intersection area A, the first electrode line 121 and the second electrode trace 122 intersect, forming two opposite first intersection angles B1 and two opposite second intersection angles B2. The two first angles B1 are obtuse angles, and the two second angles B2 are acute angles. The concave structure 130 of the first electrode line 121 is located in the intersection angle B1a, and the concave structure 130 of the second electrode line 122 is located in the intersection angle B2b. That is, one concave structure 130 is located within the intersection angle B that is an acute angle, and the other concave structure 130 is located within the intersection angle B that is an obtuse angle.

Figure 13:
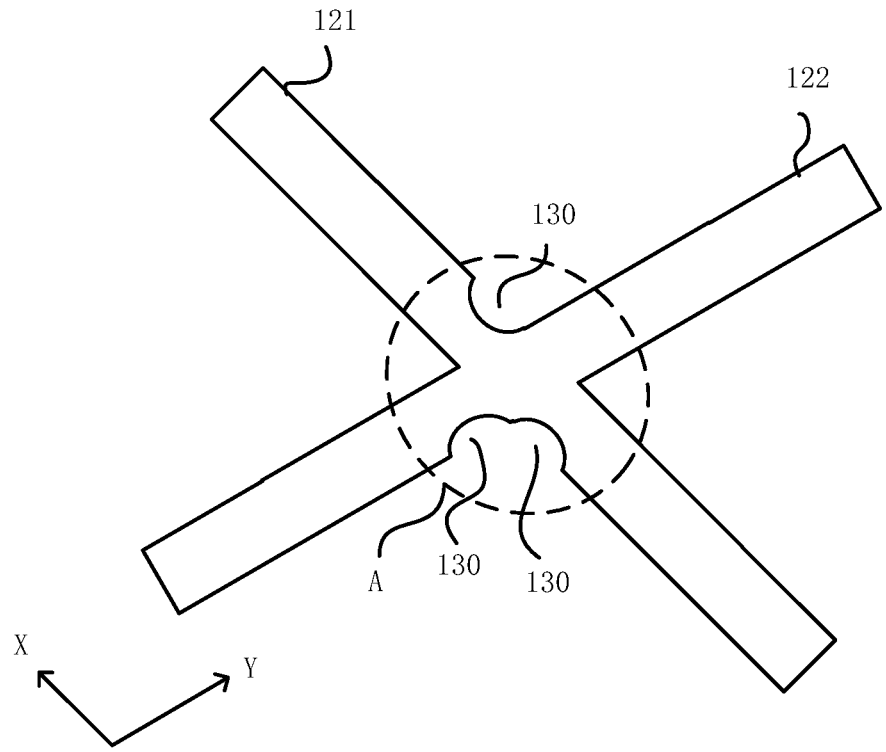
FIG. 13 illustrates another enlarged schematic diagram of part H of a touch display panel shown in FIG. 3, consistent with the disclosed embodiments of the present disclosure.

FIG. 13 illustrates another enlarged schematic diagram of part H of a touch display panel shown in FIG. 3. With reference to FIG. 13, in some embodiments, the intersection area A of the first electrode line 121 and the second electrode line 122 may include three concave structures 130. Accordingly, covering of pixels by the intersection area A may be reduced, and a problem that the area of the intersection A of the first electrode line 121 and the second electrode line 122 is too small and thus the resistance of the intersection A is too large may be avoided.

Specifically, the first electrode line 121 includes two concave structures 130. In the first direction X, the two concave structures 130 of the first electrode line 121 are located on two sides of the second electrode line 122. The second electrode line 122 includes one concave structure 130. In the second direction Y, the concave structure 130 of the second electrode line 122 is located on one side of the first electrode line 121.

It should be noted that FIG. 13 exemplarily shows a way of setting three concave structures 130 in the intersection area A. In some other embodiments, the three concave structures 130 may also be set in the intersection area A in other ways, and the other ways of setting the three concave structures 130 are not described in detail here.

With continuous reference to FIG. 4, in some embodiments, in the intersection area A, the first electrode line 121 includes a first portion 1211 and a second portion 1212 located on two sides of the second electrode line 122 respectively. The second electrode line 122 includes a third portion 1221 and a fourth portion 1222 located on two sides of the first electrode line 121 respectively. At least one of the first portion 1211, the second portion 1212, the third portion 1221, and the fourth portion 1222 includes one concave structure 130. At least one of the first portion 1211, the second portion 1212, the third portion 1221, and the fourth portion 1222 does not include two concave structures 130 set oppositely. Accordingly, it may be avoided that each of the first portion 1211, the second portion 1212, the third portion 1221 and the fourth portion 1222 includes two concave structures 130 set oppositely. Thus, fracture probability of the intersection area A may be reduced, and process difficulty may be reduced.

In some embodiments, for the electrode line including the concave structure 130, in a direction perpendicular to the extending direction of the electrode line, a side opposite to the concave structure 130 is a straight line.

With continuous reference to FIG. 4, in the intersection area A, the first electrode line 121 includes the concave structure 130. In a direction perpendicular to the extending direction of the first electrode line 121, a side opposite to the concave structure 130 is a straight line.

In some embodiments, for an electrode line including the concave structure 130, in a direction perpendicular to the extending direction of the electrode line, a side opposite to the concave structure 130 is a curved line. A concave direction of the curved line is same as a concave direction of the concave structure 130.

Figure 14:
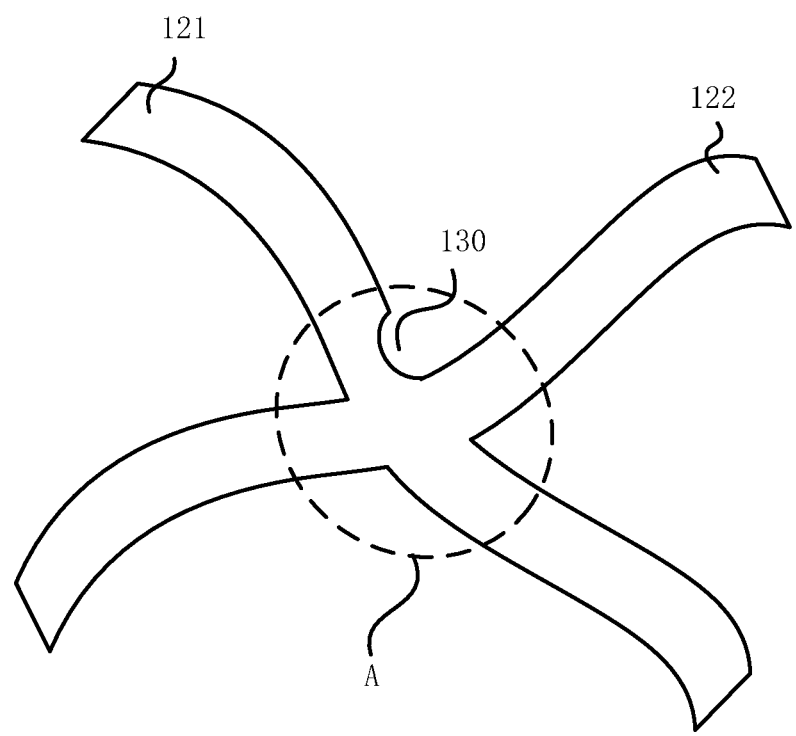
FIG. 14 illustrates another enlarged schematic diagram of part H of a touch display panel shown in FIG. 3, consistent with the disclosed embodiments of the present disclosure.

FIG. 14 illustrates another enlarged schematic diagram of part H of a touch display panel shown in FIG. 3. With reference to FIG. 14, the first electrode line 121 and the second electrode line 122 each have a curved shape. In the intersection area A, the first electrode line 121 includes the concave structure 130. In a direction perpendicular to the extending direction of the first electrode line 121, the side opposite to the concave structure 130 is a curved line.

Figure 15:
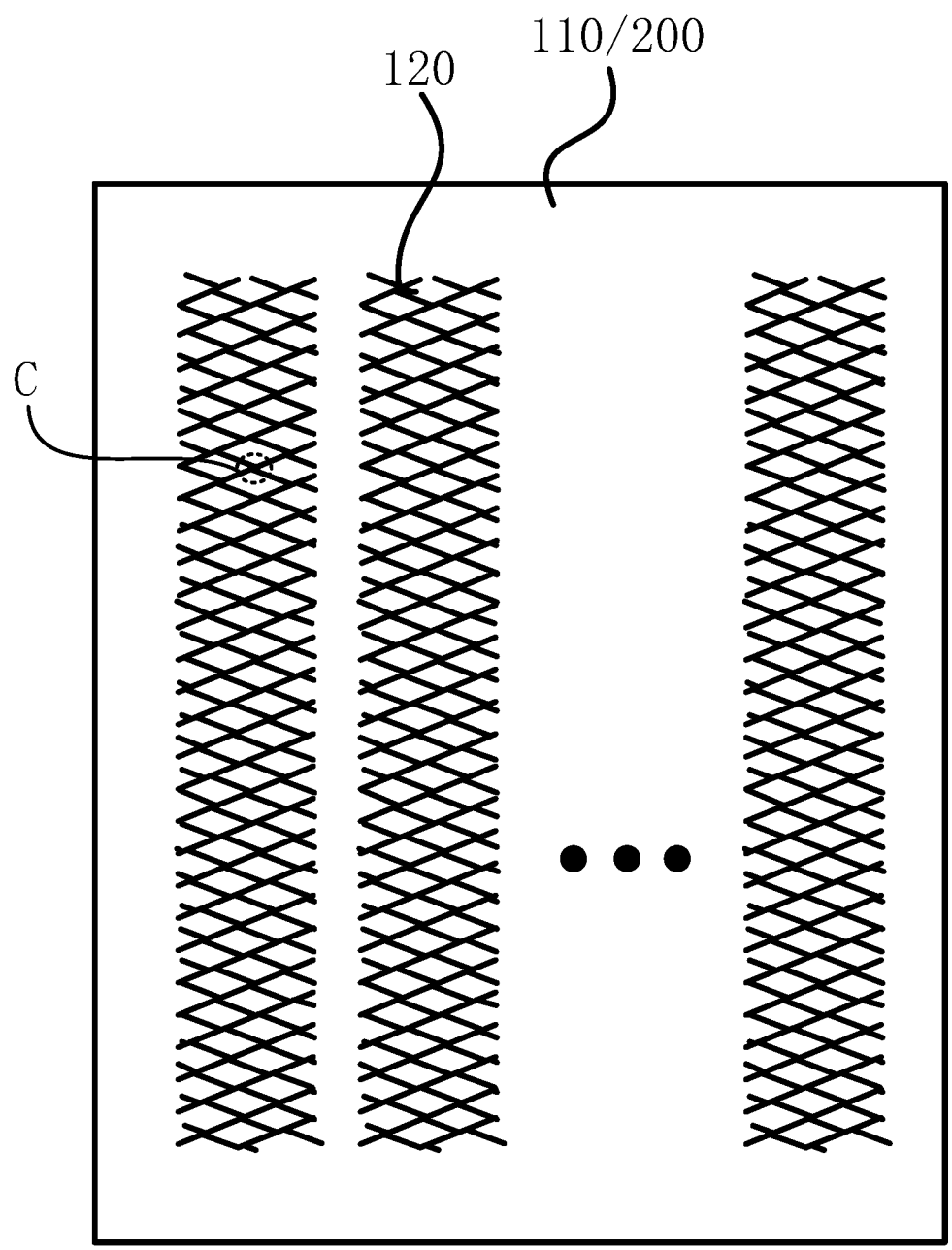
FIG. 15 illustrates a schematic plan view of another touch display panel consistent with the disclosed embodiments of the present disclosure.
Figure 16:
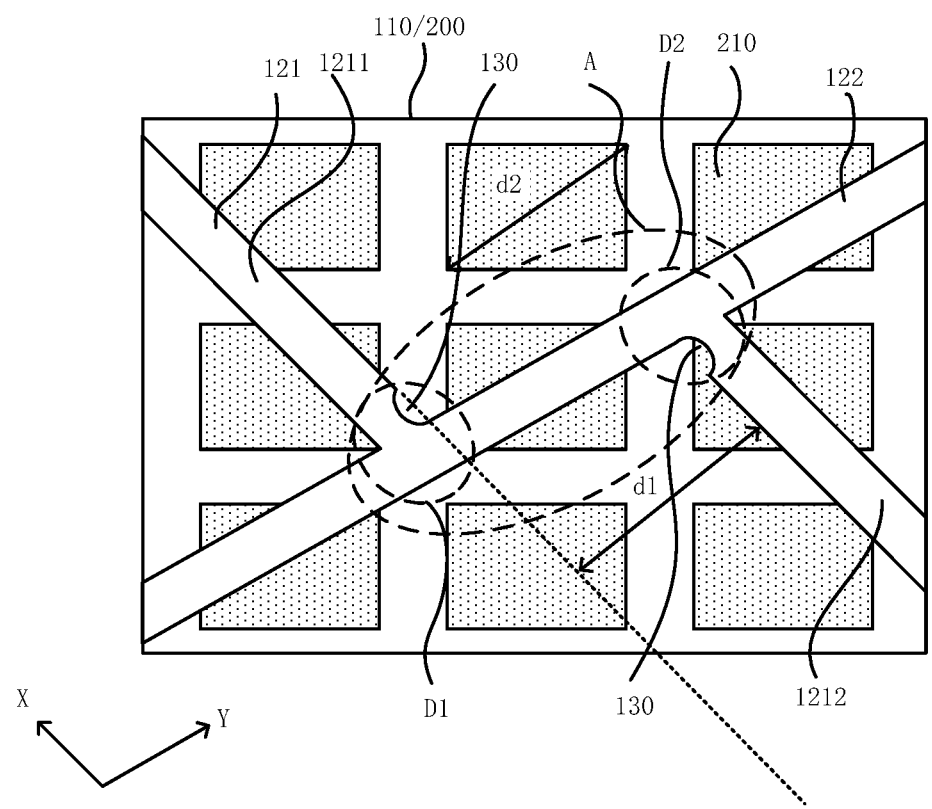
FIG. 16 illustrates an enlarged schematic diagram of part C of a touch display panel shown in FIG. 15, consistent with the disclosed embodiments of the present disclosure.

FIG. 15 illustrates a schematic plan view of another touch display panel consistent with the disclosed embodiments of the present disclosure. FIG. 16 illustrates an enlarged schematic diagram of part C of a touch display panel shown in FIG. 15. With reference to FIG. 15 and FIG. 16, in some embodiments, in the intersection area A, the first electrode line 121 includes a first portion 1211 and a second portion 1212 respectively located on two sides of the second electrode line 122. The first portion 1211 is cut off at a first position D1 of the second electrode line 122, and the second portion 1212 is cut off at a second position D2 of the second electrode line 122. The first position D1 and the second position D2 are different positions. In the intersection area A, an intersection point at the first position D1 and an intersection point at the second position D2 are set separately. The concave structure 130 may be set at the intersection point at the first position D1 and the intersection point at the second position D2 in the intersection area A.

Exemplarily, referring to FIG. 16, the first portion 1211 includes the concave structure 130, and the concave structure 130 of the first portion 1211 is located at the intersection of the first part 1211 and the second electrode line 122. The second portion 1212 includes the concave structure 130, and the concave structure 130 of the second part 1212 is located at the intersection of the second part 1212 and the second electrode line 122. It should be noted that FIG. 16 exemplarily shows a way of setting the concave structure 130. In some other embodiments, the concave structure 130 may also be set in the second electrode line 122, or only in the second electrode line 122.

In some embodiments, the touch display panel includes a display panel 200. The display panel 200 includes a plurality of pixels 210. The plurality of pixels 210 may emit light to realize display of the display panel 200. The plurality of pixels 210 in the display panel 200 may be arranged in an array. A pixel of the plurality of pixels 210 has a maximum size d2. Exemplarily, when the pixel 210 is a rectangle, the maximum size d2 of the pixel 210 is a distance along the diagonal line.

The touch electrode 120 with a metal grid structure may cover part of the pixels 210 and affect the display effect of the touch display panel. Moreover, since the intersection area A may have a large area, the interaction area A may have a large impact on the display effect of the touch display panel. In the intersection area A, the intersection point at the first position D1 and the intersection point at the second position D2 are separately set. Accordingly, the intersection area A may not have a large area covering a certain pixel 210, and thus the display effect may be improved. In addition, a distance between the first position D1 and the second position D2 is d1, where d1>d2. Accordingly, vertical projections of the intersection point at the first position D1 and the intersection point at the second position D2 in the intersection area A on the display panel 200 may not overlap a same pixel 210. Thus, the intersection point at the first position D1 and the intersection point at the second position D2 in the intersection area A may not cover a same pixel 210 at a same time. As such, display effect of the touch display panel may be improved.

Figure 17:
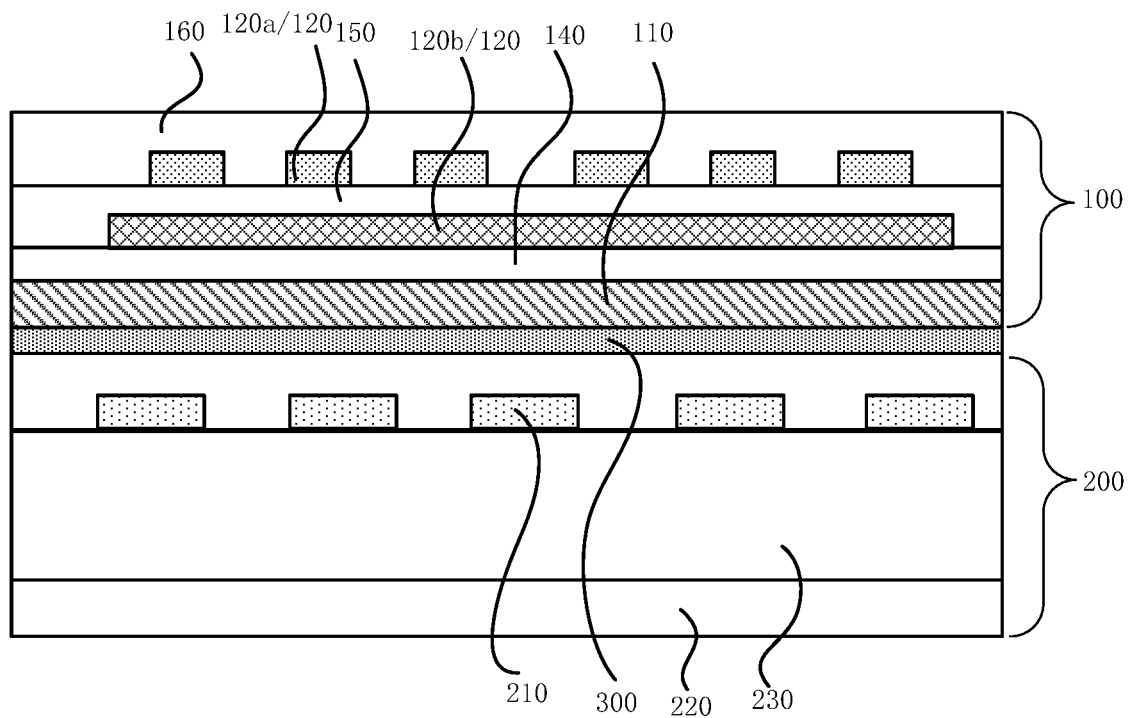
FIG. 17 illustrates a schematic structural diagram of a touch display panel consistent with the disclosed embodiments of the present disclosure.

FIG. 17 illustrates a schematic structural diagram of a touch display panel consistent with the disclosed embodiments of the present disclosure. With reference to FIG. 17, in some embodiments, the touch display panel includes a display panel 200. The display panel 200 includes a base substrate 220, an array layer 230 and a light emitting layer sequentially formed on one side of the base substrate 220. The light emitting layer includes a plurality of pixels 210. The array layer 230 includes various functional film layers related to a pixel driving circuit for driving the pixels 210 to emit light. The pixel driving circuit may include thin film transistors, storage capacitors, and other circuit elements known to those skilled in the art. Exemplarily, taking a thin film transistor as an example, the array layer may include an active layer, a gate insulation layer, a gate layer, an interlayer insulating layer, a source/drain layer, and other film layers known to those skilled in the art. A plurality of pixels 210 may be formed in the light-emitting layer. The plurality of pixels 210 is configured to emit light for displaying an image to be displayed.

The touch display panel includes a touch layer 100. The touch layer 100 includes a substrate 110. The touch layer 100 also includes a buffer layer 140, a touch electrode 120b, an insulating layer 150, a touch electrode 120a, and a protective layer 160, sequentially formed on one side of the substrate 110. It should be noted that FIG. 17 exemplarily shows a structure of the touch layer 100 in a mutual capacitance touch mode. In some other embodiments, the structure of the touch layer may include a self-capacitance touch mode. In this case, the touch layer includes a substrate. The touch layer also includes a buffer layer, a touch electrode, and a protective layer sequentially formed on one side of the substrate, and is not described in detail in the present disclosure.

The touch display panel also includes a bonding layer 300. The touch layer 100 and the display panel 200 may be made separately. Exemplarily, a thin film encapsulation layer in the display panel 200 may be multiplexed as the substrate 110 in the touch layer 100. The finished touch layer 100 and the display panel 200 may be bonded through the bonding layer 300. As such, the substrate 110 and the touch electrode 120, as a whole, may be bonded to the display panel 200 through the bonding layer 300. When the touch layer 100 is attached to the display panel 200, the touch layer 100 is attached to a light-exiting surface of the display panel 200. In addition, a side of the substrate 110 in the touch layer 100 away from the touch electrode 120 is attached to the display panel 200 to reduce the coupling between the electrode in the display panel 200 and the touch electrode 120.

In one embodiment, the touch electrode 120a in FIG. 17 is a touch driving electrode, and the touch electrode 120b in FIG. 17 is a touch sensing electrode. In some other embodiments, the touch electrode 120a in FIG. 17 is a touch sensing electrode, and the touch electrode 120b in FIG. 17 is a touch driving electrode.

It should be noted that in some other embodiments, the touch electrode 120 may also be directly fabricated in the display panel 200, or the electrode in the display panel 200 may be multiplexed as a touch electrode. There is no need to additionally form the touch electrode 120 on the display panel 200 by bonding.

Figure 18:
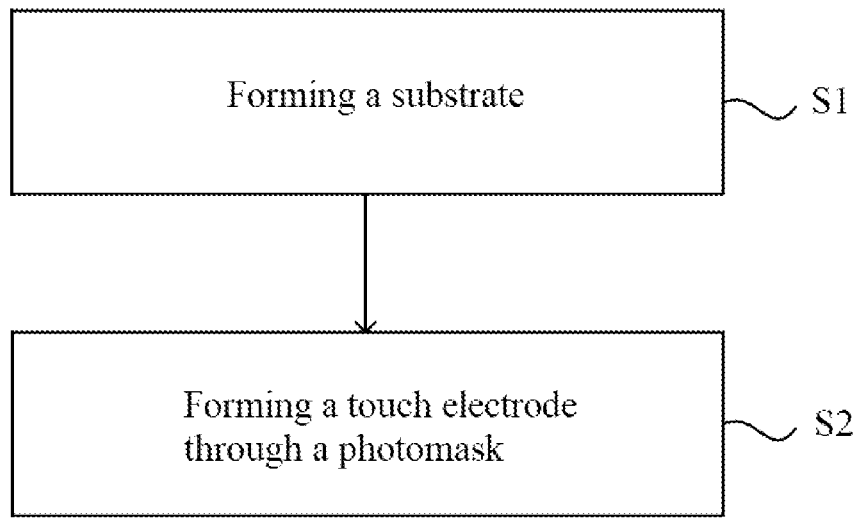
FIG. 18 illustrates a flowchart of a manufacturing method of a touch display panel consistent with the disclosed embodiments of the present disclosure.

FIG. 18 illustrates a flowchart of a manufacturing method of a touch display panel consistent with the disclosed embodiments of the present disclosure. FIGS. 19-23 illustrate schematic diagrams of a manufacturing process of a touch display panel corresponding to a manufacturing method of a touch display panel shown in FIG. 18. The present disclosure provides a manufacturing method of a touch display panel. With reference to FIGS. 18-23, the manufacturing method includes step S1 and step S2.

Figure 19:
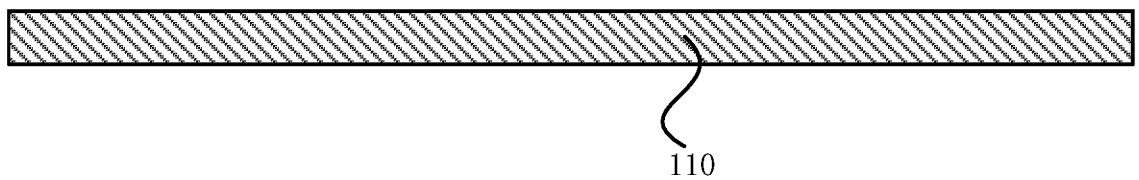
FIGS. 19-23 illustrate schematic diagrams of a manufacturing process of a touch display panel corresponding to a manufacturing method of a touch display panel shown in FIG. 18, consistent with the disclosed embodiments of the present disclosure.
Figure 20:
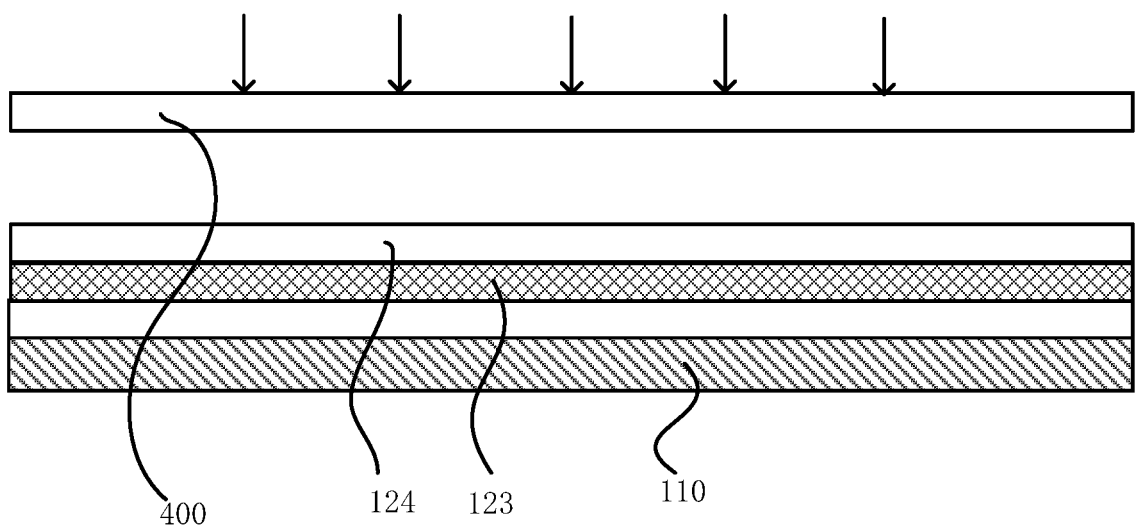

In the step S1, a substrate is formed. Referring to FIG. 19, the substrate 110 may be a rigid substrate, and the rigid substrate may be, for example, a glass substrate. The substrate 110 may also be a flexible substrate, and the flexible substrate may be, for example, a polyimide substrate.

In the step S2, a touch electrode is formed through a photomask. Specifically, referring to FIG. 20, a metal layer 123 is formed on one side of the substrate 110, and a layer of photoresist 124 is uniformly coated on the metal layer 123. Ultraviolet light irradiates the photoresist 124 on the substrate 110 through a photomask 400 for exposure.

Figure 21:
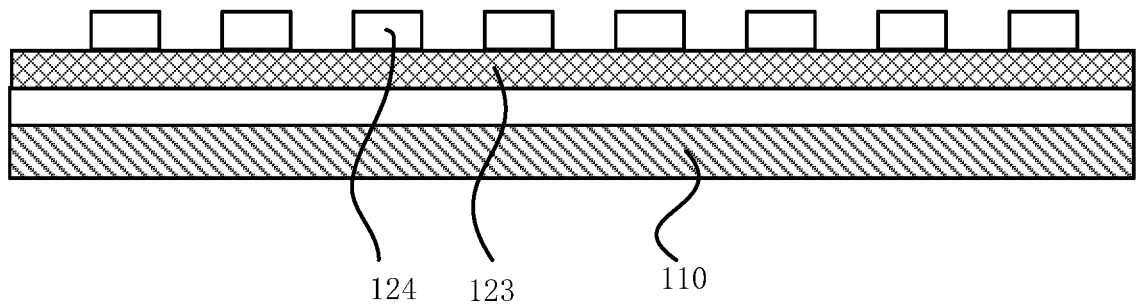

Referring to FIG. 21, an exposed portion of the photoresist 124 is dissolved by a developer, leaving a portion of the photoresist 124 in a desired pattern.

Figure 22:
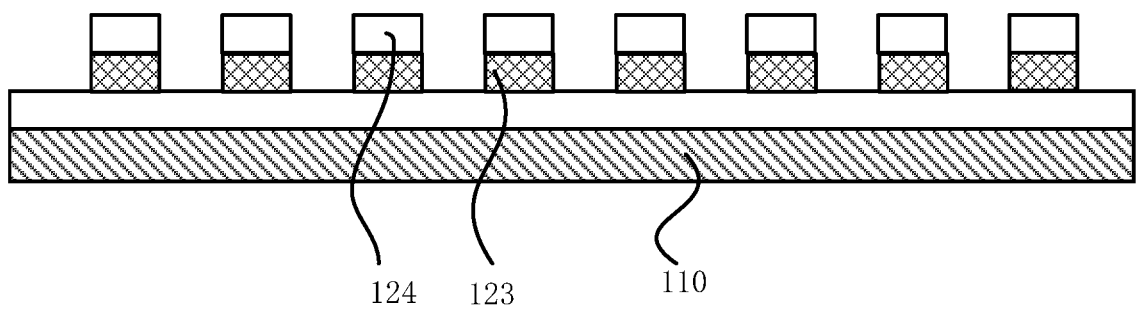

Referring to FIG. 22, a portion of the metal layer 123 not covered by the photoresist 124 is etched.

Figure 23:
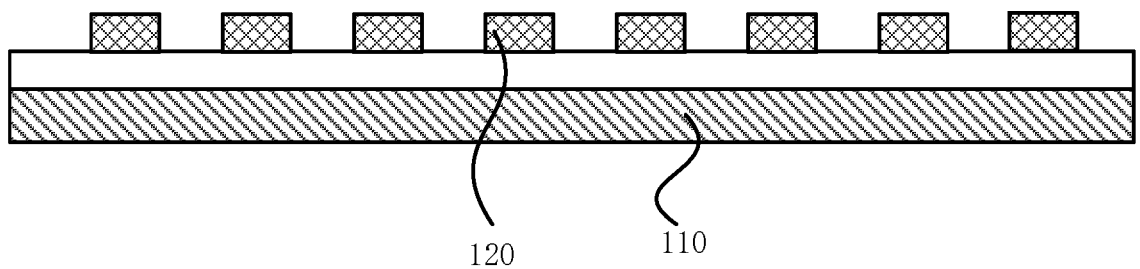

Referring to FIG. 23, the photoresist is removed, thus forming the touch electrode 120 on one side of the substrate 110.

With continuous reference to FIG. 1 and FIG. 2, in a touch display panel manufactured by a manufacturing method of a touch display panel provided by the present disclosure, a touch electrode 120 includes a first electrode line 121 and a second electrode line 122. The first electrode line 121 extends along a first direction X, and the second electrode line 122 extends along a second direction Y. The second direction Y and the first direction X are different directions. That is, the first electrode line 121 and the second electrode line 122 intersect each other. Since the first electrode line 121 and the second electrode line 122 intersect each other, an intersection area A may be formed at a location where the first electrode line 121 and the second electrode line 122 intersect. The touch electrode 120 includes the intersection area A. At least one of the first electrode line 121 and the second electrode line 122 includes a concave structure 130 in the intersection area A. Accordingly, a vertical projection area of the intersection area A of the first electrode line 121 and the second electrode line 122 on the substrate 110 may be reduced, covering of pixels by the intersection area may be reduced, and thus display effect of the display panel may be improved.

Figure 24:
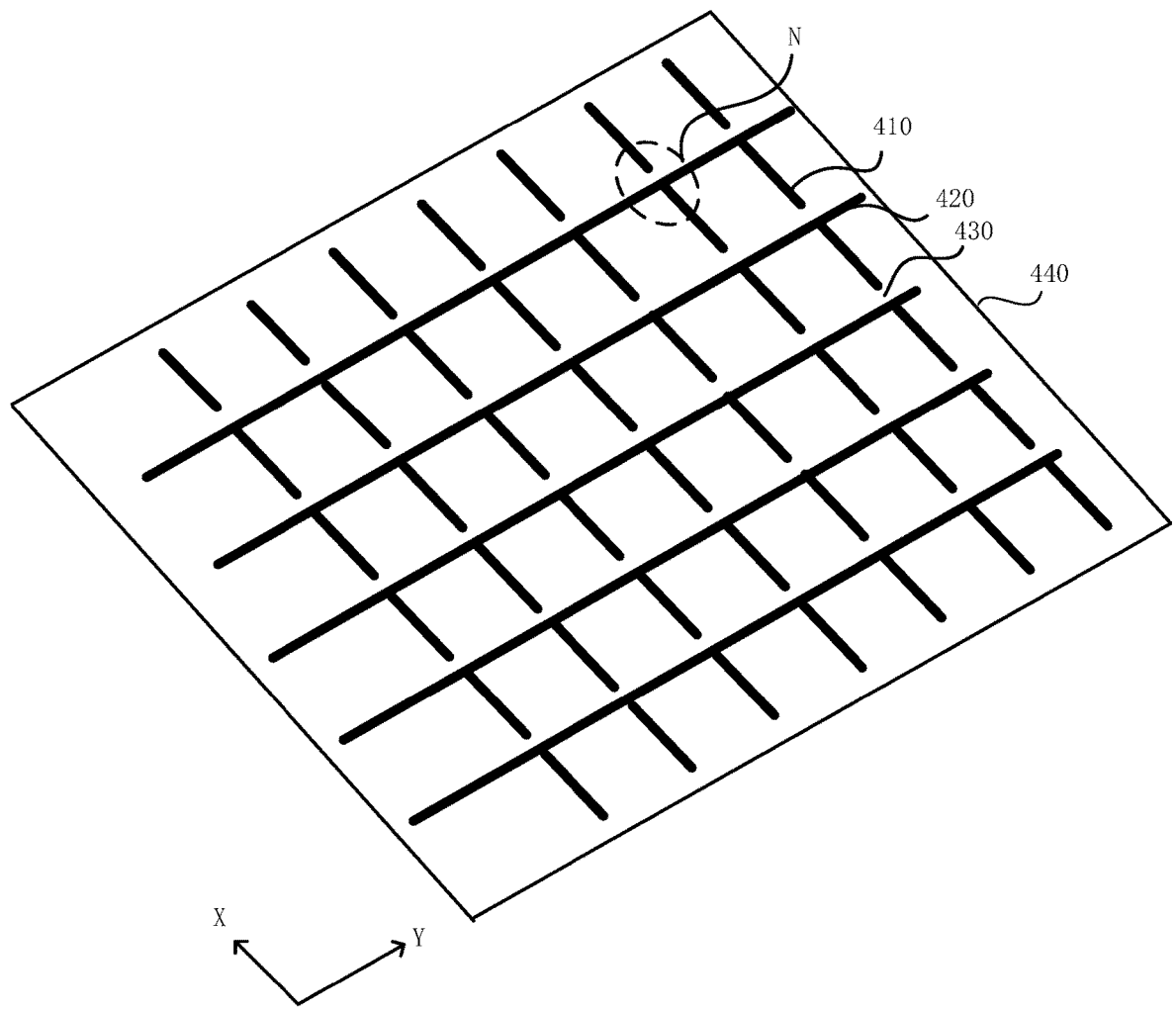
FIG. 24 illustrates a schematic structural diagram of a portion of a photomask consistent with the disclosed embodiments of the present disclosure.
Figure 25:
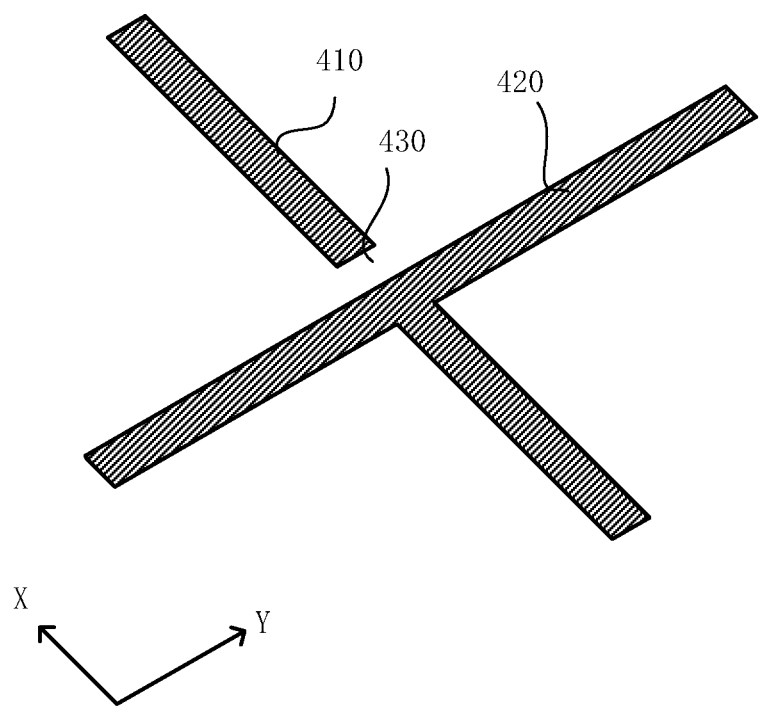
FIG. 25 illustrates an enlarged schematic diagram of part N of a photomask shown in FIG. 24, consistent with the disclosed embodiments of the present disclosure.
Figure 26:
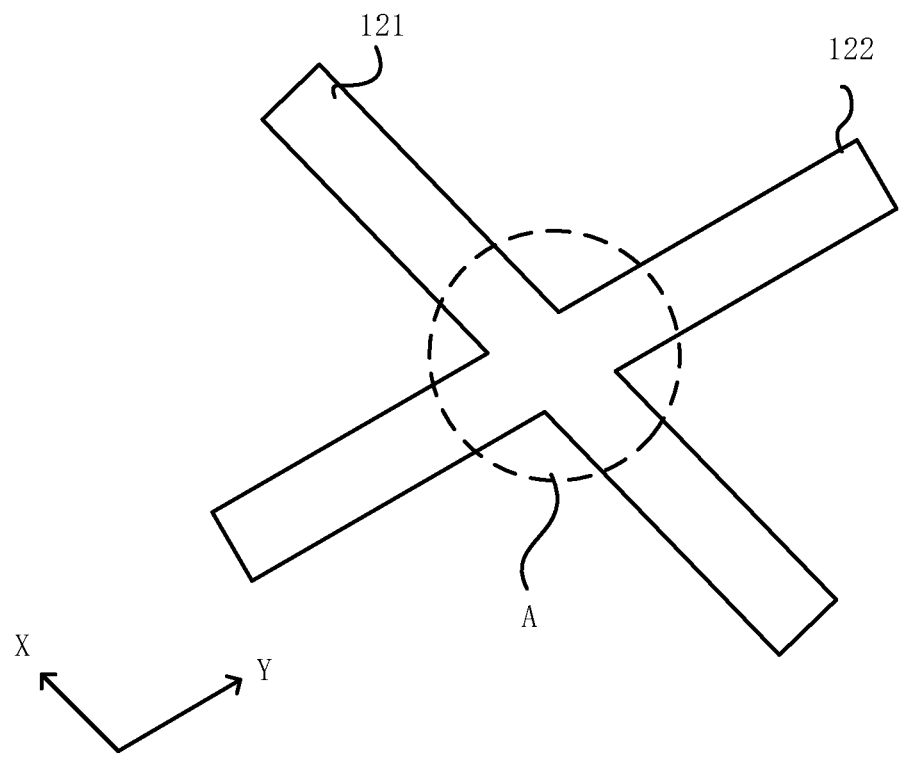
FIG. 26 illustrates another enlarged schematic diagram of part H of a touch display panel shown in FIG. 3, consistent with the disclosed embodiments of the present disclosure.

FIG. 24 illustrates a schematic structural diagram of a portion of a photomask consistent with the disclosed embodiments of the present disclosure. FIG. 25 illustrates an enlarged schematic diagram of part N of a photomask shown in FIG. 24. With reference to FIG. 24 and FIG. 25, in some embodiments, the photomask includes a first subsection 410 and a second subsection 420. The first subsection 410 extends in the first direction X, and the second subsection 420 extends in the second direction Y. FIG. 26 illustrates another enlarged schematic diagram of part H of a touch display panel shown in FIG. 3. With reference to FIGS. 24-26, the first subsection 410 is configured to form the first electrode line 121 correspondingly, and the second subsection 420 is configured to form the second electrode line 122 correspondingly.

In some embodiments, the photomask also includes a transparent substrate 440. The first subsection 410 and the second subsection 420 may be formed on one side of the transparent substrate 440. The first subsection 410 and the second subsection 420 are made of a light-shielding material.

In one embodiment, the first subsection 410 in the photomask is broken at an intersection with the second subsection 420. That is, there is at least one gap 430 between the first subsection 410 and the second subsection 420 at the intersection of the first subsection 410 and the second subsection 420. A position (intersection area A of the first electrode line 121 and the second electrode line 122) of the touch electrode 120, formed by the photomask, corresponding to the gap 430 may not be widened.

Further, with reference to FIGS. 4, 24 and 25, by adjusting the gap 430, the first electrode line 121 may include a concave structure 130 in the intersection area A.

FIG. 24 exemplarily shows that the first subsection 410 in the photomask is broken at the intersection with the second subsection 420. In some embodiments, there is at least one gap 430 between the first subsection 410 and the second subsection 420 at the intersection of the first subsection 410 and the second subsection 420. A position (intersection area A of the first electrode line 121 and the second electrode line 122) of the touch electrode 120, formed by the photomask, corresponding to the gap 430 may not be widened. Further, the second electrode line 122 may include a concave structure 130 in the intersection area A.

It should be noted that the distance of the gap 430 is less than an exposure limit, such that the intersection area A of the touch electrode 120 formed by the photomask may not break. Exemplarily, the distance of the gap 430 may be less than approximately 2 μm.

It should be noted that FIG. 24 exemplarily shows that, in the photomask, there is a gap 430 between the first subsection 410 and the second subsection 420 at the intersection of the first subsection 410 and the second subsection 420, such that the first electrode line may include a concave structure in the intersection area.

Figure 27:
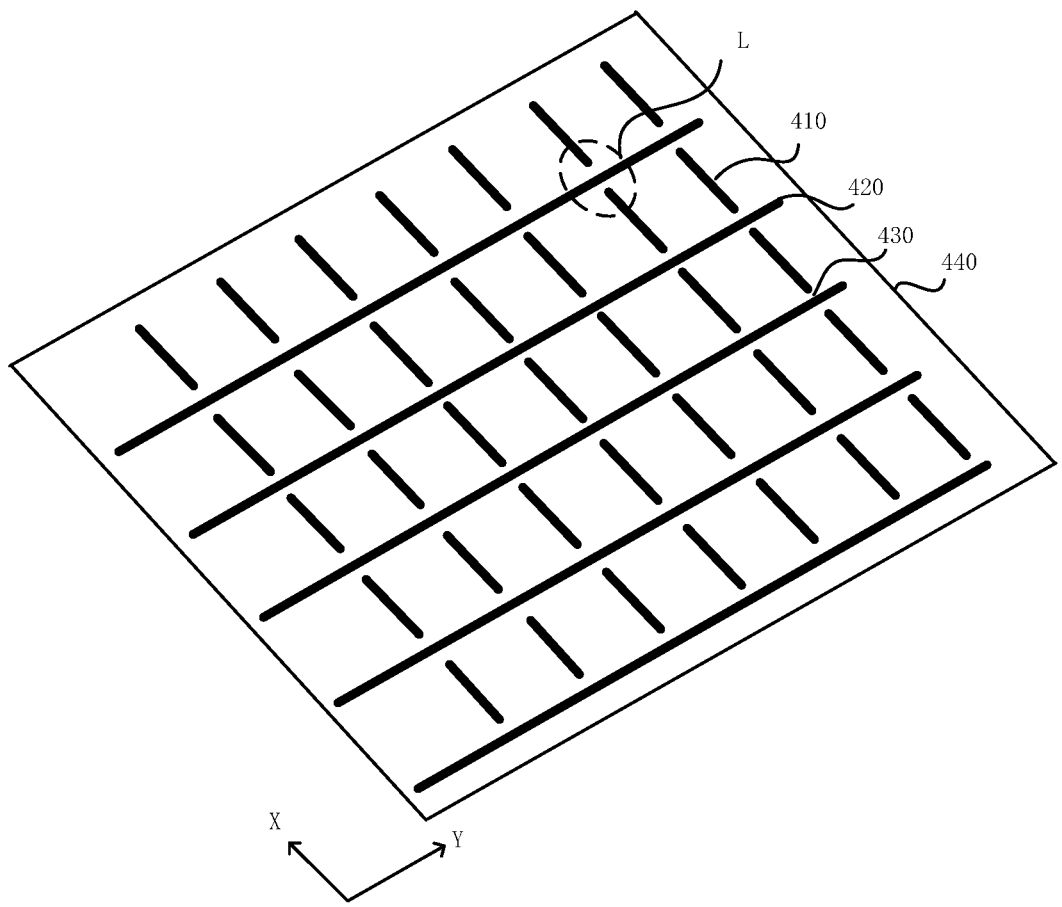
FIG. 27 illustrates a schematic structural diagram of a portion of another photomask consistent with the disclosed embodiments of the present disclosure.
Figure 28:
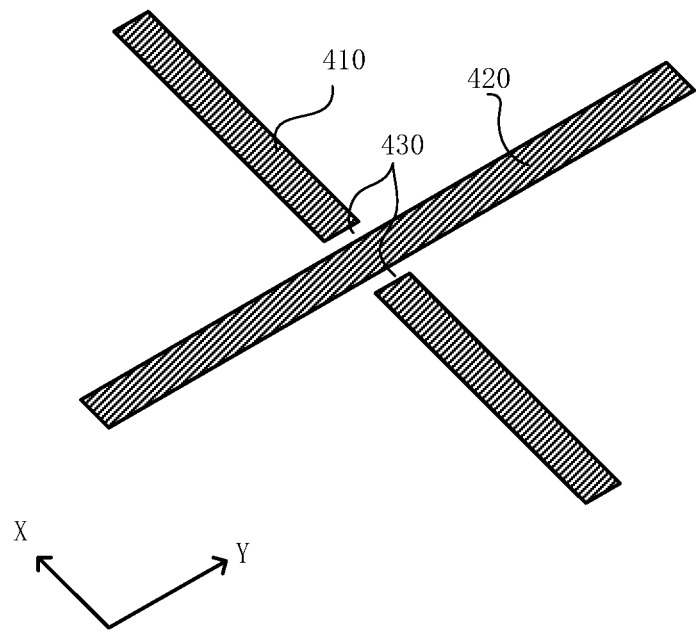
FIG. 28 illustrates an enlarged schematic diagram of part L of a photomask shown in FIG. 27, consistent with the disclosed embodiments of the present disclosure.
Figure 29:
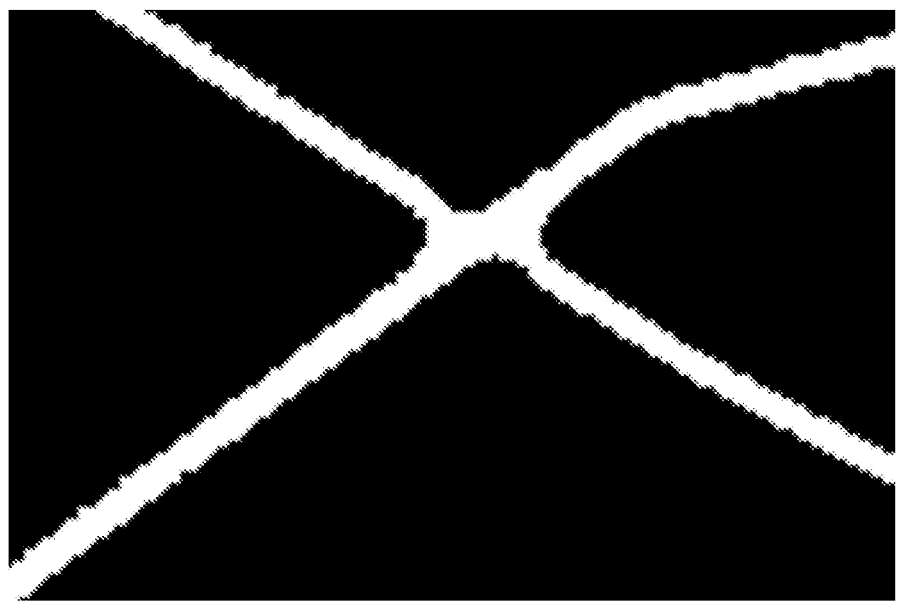
FIG. 29 illustrates is a picture of a portion of a touch electrode consistent with the disclosed embodiments of the present disclosure.

FIG. 27 illustrates a schematic structural diagram of a portion of another photomask consistent with the disclosed embodiments of the present disclosure. FIG. 28 illustrates an enlarged schematic diagram of part L of a photomask shown in FIG. 27. With reference to FIG. 27 and FIG. 28, in some embodiments, in the photomask, there are two gaps 430 between the first subsection 410 and the second subsection 420 at the intersection of the first subsection 410 and the second subsection 420. The two gaps 430 are located at two sides of the second subsection 420 at the intersection of the first subsection 410 and the second subsection 420. Correspondingly, the first electrode line may include two concave structures in the intersection area. Specifically, referring to FIG. 6, in one embodiment, the intersection area A of the touch electrode made by using the photomask provided by the present disclosure may have two concave structures 130. FIG. 29 illustrates is a picture of a portion of a touch electrode consistent with the disclosed embodiments of the present disclosure.

Figure 30:
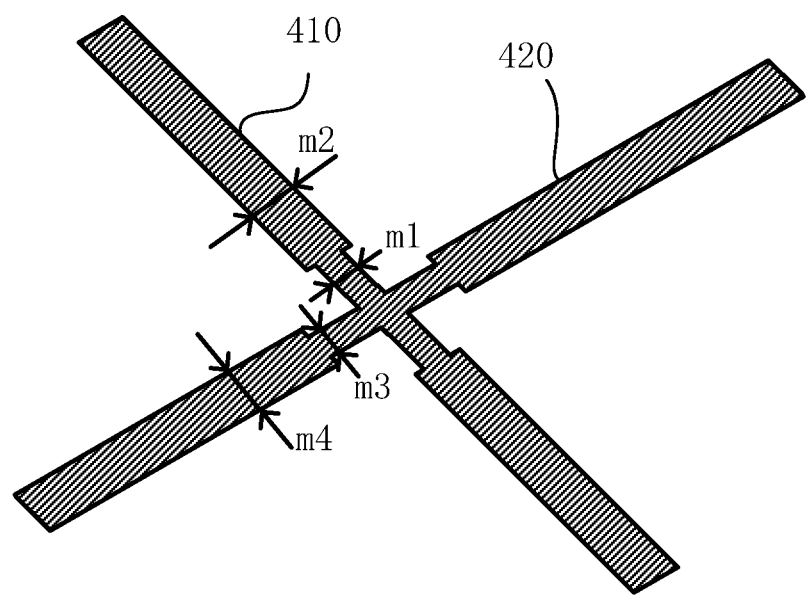
FIG. 30 illustrates a schematic structural diagram of a portion of another photomask consistent with the disclosed embodiments of the present disclosure.
Figure 30:
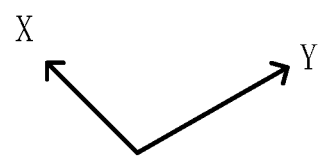

FIG. 30 illustrates a schematic structural diagram of a portion of another photomask consistent with the disclosed embodiments of the present disclosure. In some embodiments, a width of the first subsection 410 at the intersection with the second subsection 420 is m1, and a width of a regular portion of the first subsection 410 is m2, where m2>m1. That is, the width of the first subsection 410 at the intersection with the second subsection 420 is reduced. Similarly, a width of the second subsection 420 at the intersection with the first subsection 410 is m3, and a width of a regular portion of the second subsection 420 is m4, where m4>m3. That is, the width of the second subsection 420 at the intersection with the first subsection 410 is reduced. With reference to FIG. 26, a corresponding position (intersection area A of the first electrode line 121 and the second electrode line 122) of the touch electrode formed by the photomask may not be widened. In some embodiments, m2 and m4 may be equal, and m1 and m3 may be equal.

FIG. 30 shows a portion, with a width of m1, of the first subsection 410 at the intersection with the second subsection 420, formed by narrowing the first subsection 410 from two sides of the first subsection 410. In some other embodiments, a portion, with a reduced width, of the first subsection 410 at the intersection with the second subsection 420, may be formed by narrowing the first subsection 410 from one side of the first subsection 410. Similarly, a portion, with a reduced width, of the second subsection 420 may be formed by narrowing the second subsection 420 from one side of the second subsection 420.

Figure 31:
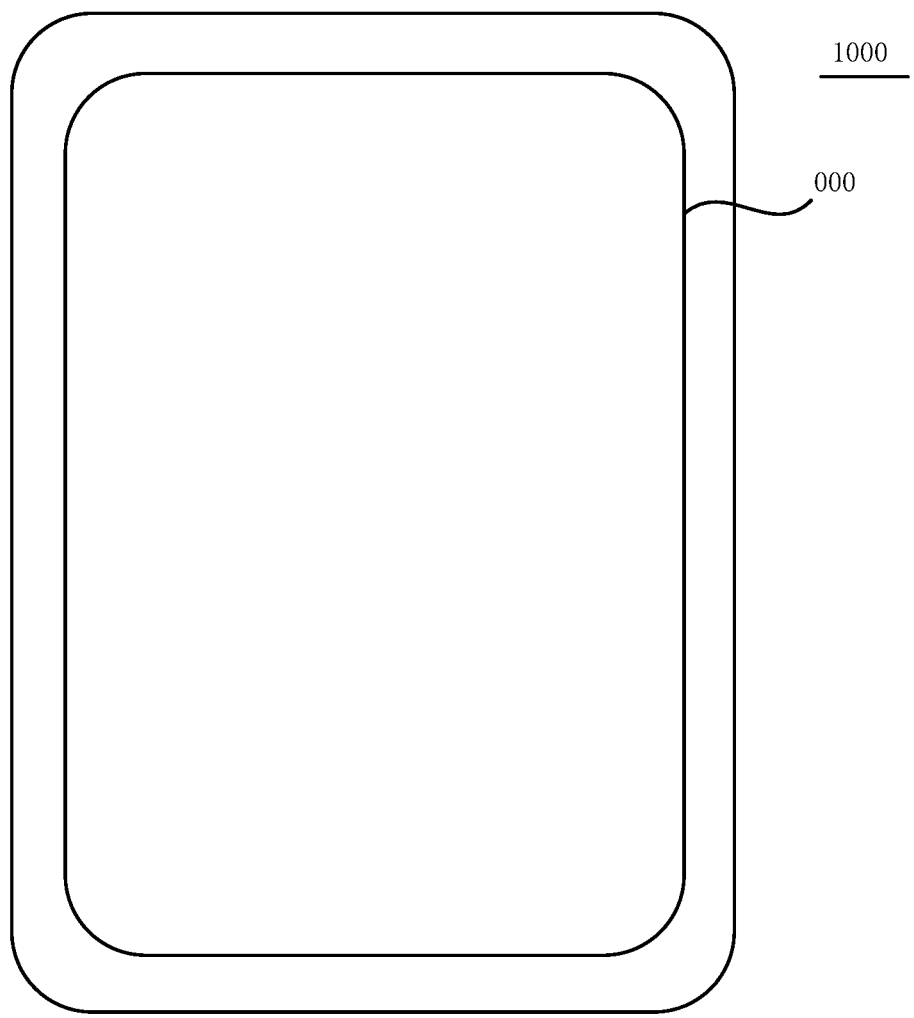
FIG. 31 illustrates is a schematic plan view of a display device consistent with the disclosed embodiments of the present disclosure.

FIG. 31 illustrates is a schematic plan view of a display device consistent with the disclosed embodiments of the present disclosure. With reference to FIG. 31, the present disclosure also provides a display device 1000. The display device 1000 includes a touch display panel 000 provided by the present disclosure. FIG. 31 only uses a mobile phone as an example to illustrate the display device 1000. It may be understandable that the display device 1000 provided by the present disclosure may also be a computer, a television, a vehicle-mounted display device, and other display devices 1000 having a display function, and is not specifically limited in the present disclosure. The display device 1000 provided by the present disclosure may have beneficial effects of the touch display panel 000 provided by the present disclosure. For details, reference may be made to specific description of the touch display panel in the present disclosure.

As disclosed, the technical solutions of the present disclosure have the following advantages.

A touch display panel provided by the present disclosure includes a substrate and a touch electrode on the substrate. The touch electrode includes a first electrode line extending in a first direction, and a second electrode line extending in a second direction. The second direction is different from the first direction. The display panel also includes an intersection area. In the intersection area, the first electrode line intersects with the second electrode line. At least one of the first electrode line and the second electrode line includes a concave structure in the intersection area, such that a vertical projection area of the intersection area of the first electrode line and the second electrode line on the substrate may be reduced. Accordingly, covering of pixels by the intersection area may be reduced, and display effect of the display panel may thus be improved.

The embodiments disclosed herein are exemplary only and not limiting the scope of this disclosure. Various combinations, alternations, modifications, equivalents, or improvements to the technical solutions of the disclosed embodiments can be obvious to those skilled in the art. Without departing from the spirit and scope of this disclosure, such combinations, alternations, modifications, equivalents, or improvements to the disclosed embodiments are intended to be encompassed within the scope of the present disclosure.

What is claimed is:

1. A touch display panel, comprising:
   a substrate; and
   a touch electrode on the substrate, wherein the touch electrode includes:
   a first electrode line extending in a first direction;
   a second electrode line extending in a second direction, wherein the second direction is different from the first direction; and
   an intersection area, wherein:
      in the intersection area, the first electrode line intersects and connects with the second electrode line; and
      at least one of the first electrode line and the second electrode line includes one or more concave structures in the intersection area, wherein a concave structure is recessed towards inside of a corresponding electrode line and has a minimum line width smaller than a line width of a normal portion of the corresponding electrode line outside the intersection area.

2. The touch display panel according to claim 1, wherein:
   in the intersection area, the first electrode line includes the one or more concave structures, and the second electrode line does not include the concave structures.

3. The touch display panel according to claim 2, wherein:
   in the intersection area, the first electrode line includes one concave structure; and
   in the first direction, the one concave structure is located on one side of the second electrode line.

4. The touch display panel according to claim 2, wherein:
   in the intersection area, the first electrode line includes two concave structures; and
   in the first direction, the two concave structures are respectively located on two sides of the second electrode line.

5. The touch display panel according to claim 4, wherein:
   the two concave structures are respectively located on two opposite sides of the first electrode line; or
   the two concave structures are located on a same side of the first electrode line.

6. The touch display panel according to claim 2, wherein:
   in the intersection area, a minimum width of the second electrode line in a direction perpendicular to the second direction is W1; and
   in an area other than the intersection area, a width of the second electrode line in the direction perpendicular to the second direction is W2, wherein W1≥0.9×W2.

7. The touch display panel according to claim 6, wherein: W1≥W2.

8. The touch display panel according to claim 1, wherein:
   in the intersection area, each of the first electrode line and the second electrode line includes at least one concave structure.

9. The touch display panel according to claim 8, wherein:
   in the intersection area, the first electrode line includes one concave structure, and the second electrode line includes one concave structure;
   in the first direction, the one concave structure of the first electrode line is located on one side of the second electrode line; and
   in the second direction, the one concave structure of the second electrode line is located on one side of the first electrode line.

10. The touch display panel according to claim 9, wherein:
    the first electrode line and the second electrode line intersect, thereby defining four intersection angles, wherein for one intersection angle of the four intersection angles, the one concave structure of the first electrode line and the one concave structure of the second electrode line are each located within the one intersection angle; or
    the first electrode line and the second electrode line intersect, thereby defining four intersection angles, wherein for one intersection angle of the four intersection angles, the one concave structure of the first electrode line and the one concave structure of the second electrode line are each located outside the one intersection angle, or for one intersection angle of the four intersection angles, one of the one concave structure of the first electrode line and the one concave structure of the second electrode line is located within the one intersection angle, and another one of the one concave structure of the first electrode line and the one concave structure of the second electrode line is located outside the one intersection angle.

11. The touch display panel according to claim 1, wherein:
    in the intersection area, the first electrode line includes a first portion and a second portion located on two sides of the second electrode line respectively;
    the second electrode line includes a third portion and a fourth portion located on two sides of the first electrode line respectively;
    at least one of the first portion, the second portion, the third portion, and the fourth portion includes a concave structure; and
    at least one of the first portion, the second portion, the third portion, and the fourth portion does not include two concave structures, set oppositely with each other.

12. The touch display panel according to claim 1, wherein:
    the first electrode line and the second electrode line intersect, thereby defining four intersection angles; and
    the four intersection angles are equal to each other.

13. The touch display panel according to claim 1, wherein:

the first electrode line and the second electrode line intersect, thereby defining four intersection angles, wherein the four intersection angles include two acute angles and two obtuse angles; and in the intersection area, the one or more concave structures are each located in the two acute angles of the four intersection angles, or in the intersection area, the one or more concave structures are each located in the two obtuse angles of the four intersection angles.

14. The touch display panel according to claim 1, wherein:

for an electrode line of the first electrode line and the second electrode line that includes the one or more concave structures, in a direction perpendicular to an extending direction of the electrode line, a side opposite to the one or more concave structures includes a straight line; or for an electrode line of the first electrode line and the second electrode line that includes the one or more concave structures, in a direction perpendicular to an extending direction of the electrode line, a side opposite to the one or more concave structures includes a curved line, and a concave direction of the curved line is same as a concave direction of the one or more concave structures.

15. The touch display panel according to claim 1, wherein:

in the intersection area, the first electrode line includes a first portion and a second portion respectively located on two sides of the second electrode line;

the first portion is cut off at a first position of the second electrode line, and the second portion is cut off at a second position of the second electrode line;

the first position and the second position are different positions; and the touch display panel further comprises a display panel, wherein the display panel includes a plurality of pixels, a distance between the first position and the second position is d1, and a pixel of the plurality of pixels has a maximum size d2, wherein d1>d2.

16. The touch display panel according to claim 1, wherein:

the touch electrode may include a metal grid structure.

17. The touch display panel according to claim 1, further comprising a display panel and a bonding layer, wherein:

the substrate and the touch electrode, as a whole, are bonded to the display panel through the bonding layer.

18. A manufacturing method of a touch display panel, comprising:

forming a substrate; and forming a touch electrode through a photomask, wherein the touch electrode includes:

a first electrode line extending in a first direction;

a second electrode line extending in a second direction, wherein the second direction is different from the first direction; and an intersection area, wherein:

in the intersection area, the first electrode line intersects and connects with the second electrode line; and at least one of the first electrode line and the second electrode line includes one or more concave structures in the intersection area, wherein a concave structure is recessed towards inside of a corresponding electrode line and has a minimum line width smaller than a line width of a normal portion of the corresponding electrode line outside the intersection area.

19. The manufacturing method according to claim 18, wherein:

the photomask includes a first subsection and a second subsection;

the first subsection extends in the first direction, and is configured to form the first electrode line correspondingly;

the second subsection extends in the second direction, and is configured to form the second electrode line correspondingly; and the first subsection is broken at an intersection with the second subsection, or the second subsection is broken at an intersection with the first subsection.

20. A display device, comprising a touch display panel including:

a substrate; and a touch electrode on the substrate, wherein the touch electrode includes:

a first electrode line extending in a first direction;

a second electrode line extending in a second direction, wherein the second direction is different from the first direction; and an intersection area, wherein:

in the intersection area, the first electrode line intersects and connects with the second electrode line; and at least one of the first electrode line and the second electrode line includes one or more concave structures in the intersection area, wherein a concave structure is recessed towards inside of a corresponding electrode line and has a minimum line width smaller than a line width of a normal portion of the corresponding electrode line outside the intersection area.

* * * * *